(12) United States Patent
Balash et al.

(10) Patent No.: US 10,001,203 B2
(45) Date of Patent: Jun. 19, 2018

(54) SPROCKET ASSEMBLY

(71) Applicant: Vaughan Industries Inc., Detroit, MI (US)

(72) Inventors: Andrew Vaughan Balash; Jon Bertolet, Troy, MI (US)

(73) Assignee: Vaughan Industries Inc., Detroit, MI (US)

( * ) Notice: Subject to any disclaimer, the term of this patent is extended or adjusted under 35 U.S.C. 154(b) by 0 days. days.

(21) Appl. No.: 15/269,439

(22) Filed: Sep. 19, 2016

(65) Prior Publication Data

US 2017/0037951 A1 Feb. 9, 2017

Related U.S. Application Data

(60) Continuation-in-part of application No. 14/938,984, filed on Nov. 12, 2015, now Pat. No. 9,777,821, which is a division of application No. 13/622,428, filed on Sep. 19, 2012, now Pat. No. 9,194,476.

(51) Int. Cl.
*F16H 55/36* (2006.01)
*F16H 55/30* (2006.01)
*F16H 55/08* (2006.01)
*F16H 55/12* (2006.01)

(52) U.S. Cl.
CPC .............. *F16H 55/12* (2013.01); *F16H 55/08* (2013.01); *F16H 55/303* (2013.01); *Y10T 29/49462* (2015.01)

(58) Field of Classification Search
CPC .......... F16H 55/12; F16H 55/30; F16H 55/08; B23P 11/00

USPC ......................................................... 474/162
See application file for complete search history.

(56) References Cited

U.S. PATENT DOCUMENTS

| | | | | |
|---|---|---|---|---|
| 243,738 A * | 7/1881 | Stutz | ....................... | F16H 55/30 |
| | | | | 474/162 |
| 277,774 A * | 5/1883 | Okell | ........................... | 198/712 |
| 358,771 A * | 3/1887 | Dodge | .................... | F16H 55/30 |
| | | | | 474/162 |
| 405,607 A * | 6/1889 | Selleck | ................... | F16H 55/30 |
| | | | | 474/162 |
| 457,420 A * | 8/1891 | Neacy | ..................... | F16H 55/30 |
| | | | | 474/162 |
| 623,431 A * | 4/1899 | Schaefer | ................. | F16H 55/30 |
| | | | | 139/333 |
| 708,232 A * | 9/1902 | Jackling | .................. | F16H 55/54 |
| | | | | 474/162 |

(Continued)

*Primary Examiner* — William E Dondero
*Assistant Examiner* — Mark K Buse
(74) *Attorney, Agent, or Firm* — Buckert Patent & Trademark Law Firm PC; John F. Buckert

(57) ABSTRACT

A sprocket assembly is provided. The assembly includes a sprocket frame having a central body and a first ledge portion body. The first ledge portion has a first aperture extending therethrough. The assembly further includes a first removable tooth having a first tip portion, first and second landing portions, and a first extension portion. The first tip portion has first and second ends. The first extension portion extends from the second end and has an aperture extending therethrough. The assembly further includes a first screw extending through the first aperture in the first ledge portion and the aperture in the first extension portion to removably couple the first extension portion to the first ledge portion.

7 Claims, 32 Drawing Sheets

(56) References Cited

U.S. PATENT DOCUMENTS

| | | | | |
|---|---|---|---|---|
| 736,904 | A * | 8/1903 | Willson, Jr. | F16G 13/06 474/162 |
| 969,237 | A * | 9/1910 | Woolnough et al. | F16H 55/12 474/162 |
| 1,530,403 | A * | 3/1925 | Parsons | F16H 55/303 474/162 |
| 1,630,313 | A * | 5/1927 | Rorabeck | F16H 55/30 474/162 |
| 1,829,874 | A * | 11/1931 | Rorabeck | B62D 55/135 474/162 |
| 3,212,253 | A * | 10/1965 | Granberg | B25B 27/22 59/7 |
| 3,381,354 | A * | 5/1968 | Krempa | B23F 15/00 29/525.02 |
| 3,439,551 | A * | 4/1969 | Militana | F16H 55/12 474/162 |
| 3,563,471 | A * | 2/1971 | Watkin | B05B 1/3073 239/451 |
| 3,861,232 | A * | 1/1975 | Bravin | F16G 13/02 474/141 |
| 3,934,484 | A * | 1/1976 | Bravin | F16H 55/12 474/156 |
| 3,960,412 | A * | 6/1976 | Shuler | B62D 55/135 305/199 |
| 4,058,023 | A * | 11/1977 | Smith | B65G 23/06 403/337 |
| 4,344,255 | A * | 8/1982 | Knoll | E06B 3/5063 49/453 |
| 4,478,532 | A * | 10/1984 | Puro | B25B 7/08 16/342 |
| 4,532,736 | A * | 8/1985 | Shinnennan, Jr. | B24B 41/066 269/243 |
| 4,570,887 | A * | 2/1986 | Banister | F16M 11/041 248/187.1 |
| 4,572,588 | A * | 2/1986 | Wiesner | B62D 55/211 305/203 |
| 4,927,308 | A * | 5/1990 | DiMarco | F16B 37/005 403/260 |
| 5,027,141 | A * | 6/1991 | Bowers | F16M 13/00 396/419 |
| 5,154,019 | A * | 10/1992 | Day | E05D 5/023 49/504 |
| 5,380,254 | A * | 1/1995 | Maguire | B21K 1/30 474/152 |
| 6,336,882 | B1 * | 1/2002 | Ullein | F01L 1/02 474/161 |
| 7,967,709 | B2 * | 6/2011 | Emura | B62M 9/105 474/160 |
| 2011/0006563 | A1 * | 1/2011 | Panther | B60J 7/024 296/216.08 |
| 2014/0080645 | A1 * | 3/2014 | Balash | F16H 55/303 474/162 |

\* cited by examiner

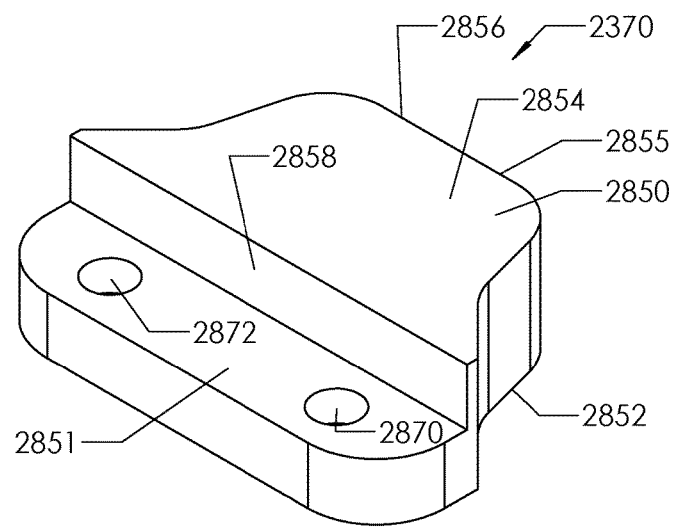
FIG.26
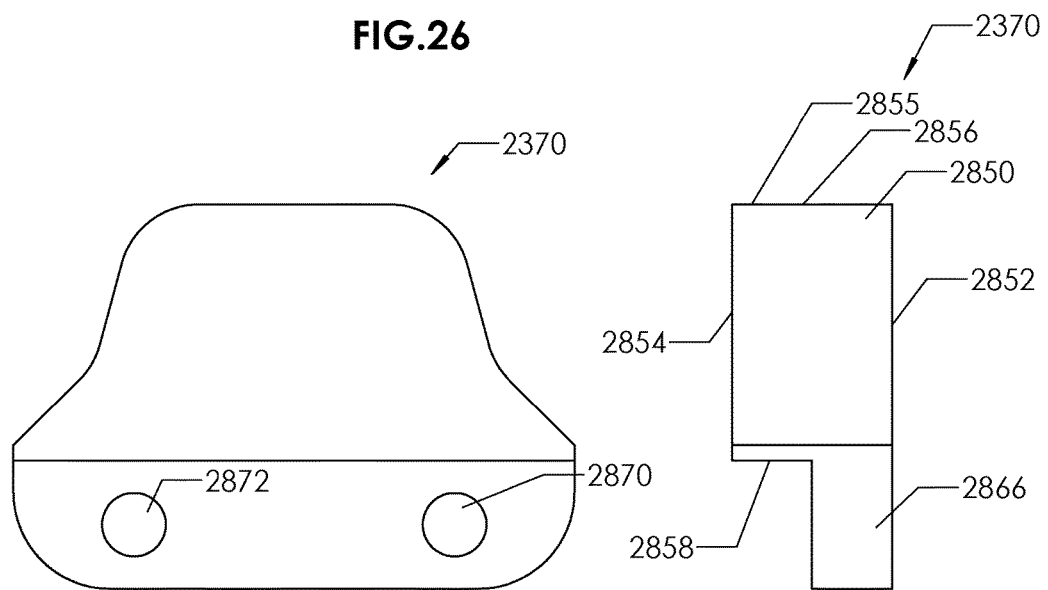
FIG.27
FIG.28

SPROCKET ASSEMBLY

CROSS-REFERENCE TO RELATED APPLICATIONS

This application is a continuation-in-part of U.S. patent application Ser. No. 14/938,984 filed on Nov. 12, 2015, and U.S. patent application Ser. No. 14/938,984 is a divisional application of U.S. Pat. No. 9,194,476 issued on Nov. 24, 2015, and the entire contents of each of the above-identified patent applications and patents are hereby incorporated by reference herein.

BACKGROUND

The inventor herein has recognized a need for an improved sprocket assembly with teeth having recessed bolts such that the bolts are less likely to contact other components of a car wash conveyor system.

SUMMARY

A sprocket assembly in accordance with an exemplary embodiment is provided. The sprocket assembly includes an octagonal-shaped sprocket frame having a central body and first, second, third, and fourth trapezoidal-shaped ledge portions extending from the central body. The central body has first, second, third, and fourth ends. The first and second ends of the central body extend substantially parallel to one another. The third and fourth ends of the central body extend substantially parallel to one another and substantially perpendicular to the first and second ends of the central body. The first and second trapezoidal-shaped ledge portions are coupled to and extend from the first and second ends, respectively, of the central body and are spaced apart from one another and extend substantially parallel to one another. The third and fourth trapezoidal-shaped ledge portions are coupled to and extend from the third and fourth ends, respectively, of the central body and are spaced apart from one another and extend substantially parallel to one another and substantially perpendicular to the first and second trapezoidal-shaped ledge portions. The sprocket assembly further includes a first removable tooth having a first tip portion and a first extension portion. The first tip portion and the first extension portion define a top surface of the first removable tooth. The first tip portion has first and second ends. The first extension portion extends from the second end of the first tip portion. The first extension portion is removably coupled to the first trapezoidal-shaped ledge portion utilizing a first bolt extending through first and second apertures in the first extension portion and the first trapezoidal-shaped ledge portion, respectively. The first bolt has a first head portion and a first shaft portion coupled to the first head portion. The first head portion is disposed in the first aperture in the first extension portion of the first removable tooth such that a top surface of the first head portion is disposed substantially co-planar with the top surface of the first removable tooth. The sprocket assembly further includes a second removable tooth having a second tip portion and a second extension portion. The second tip portion and the second extension portion define a top surface of the second removable tooth. The second tip portion has first and second ends. The second extension portion extends from the second end of the second tip portion. The second extension portion is removably coupled to the second trapezoidal-shaped ledge portion utilizing a second bolt extending through third and fourth apertures in the second extension portion and the second trapezoidal-shaped ledge portion, respectively. The second bolt has a second head portion and a second shaft portion coupled to the second head portion. The second head portion is disposed in the third aperture in the second extension portion of the second removable tooth such that a top surface of the second head portion is disposed substantially co-planar with the top surface of the second removable tooth.

BRIEF DESCRIPTION OF THE DRAWINGS

FIG. 26 is a schematic having an isometric view of a first removable tooth utilized in the sprocket assembly of FIG. 22;

FIG. 27 is a schematic having a side view of the first removable tooth of FIG. 26;

FIG. 28 is a schematic having another side view of the first removable tooth of FIG. 26;

DETAILED DESCRIPTION

Figure 1:
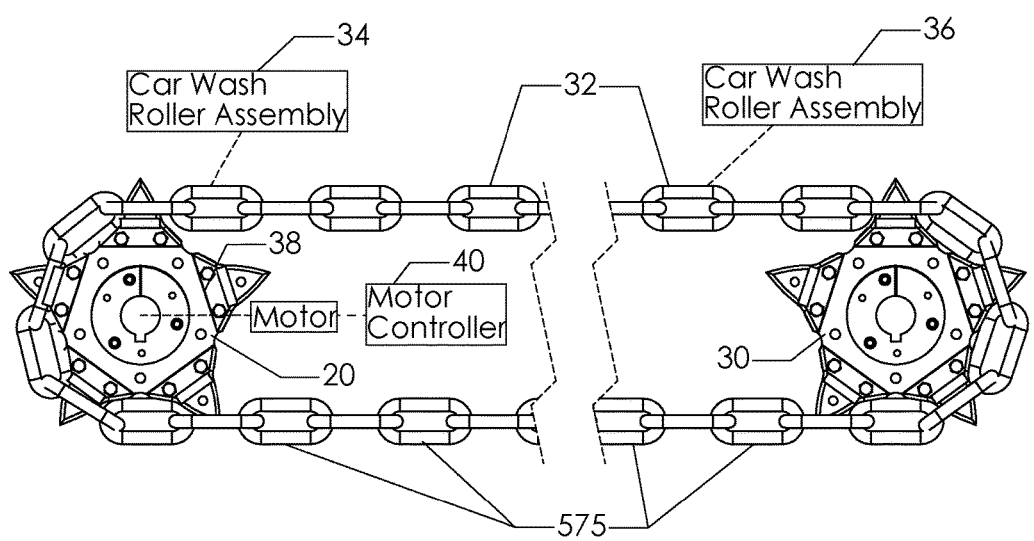
FIG. 1 is a schematic of a car wash conveyor system in accordance with an exemplary embodiment.

Referring to FIGS. 1-6, a car wash conveyor system 10 in accordance with an exemplary embodiment is provided. The car wash conveyor system 10 includes a sprocket assembly 20, a sprocket assembly 30, a chain 32, a car wash roller assembly 34, a car wash roller assembly 36, a motor 38, and a motor controller 40. An advantage of the sprocket assembly 20 is that the sprocket assembly 20 utilizes removable teeth that are configured to be readily replaced when the removable teeth become degraded.

The motor 38 has a shaft (not shown) that rotates the sprocket assembly 20 in response to receiving control signals from the motor controller 40. When the sprocket assembly 20 rotates in a first rotational direction, removable teeth in the sprocket assembly 20 engage chain links in the chain 32 to move the chain 32 in a predetermined direction. In response to the movement of the chain 32 in the predetermined direction, car wash roller assemblies 34, 36 that are coupled to the chain 32 move along with the chain 32. Further, the sprocket assembly 30 engages chain links in the chain 32 and rotates in the first rotational direction in response to the movement of the chain 32. In an exemplary embodiment, the car wash roller assemblies 34, 36 can comprise at least one of the car wash roller assemblies described in U.S. Pat. No. 8,161,888 or U.S. patent application Ser. No. 13/100,607, which are both incorporated by reference herein in their entirety.

Referring to FIGS. 2-6, the sprocket assemblies 20, 30 have an identical structure to one another. Accordingly, only the structure of the sprocket assembly 20 will be described in greater detail below. The sprocket assembly 20 includes a sprocket frame 60, a removable tooth 70, a removable tooth 80, a removable tooth 90, a removable tooth 100, a removable tooth 110, bolts 170, 172, 180, 182, 190, 192, 200, 202, 210, 212, nuts 270, 272, 280, 282, 290, 292, 300, 302, 310, 312, an insert bushing 350, and bolts 352, 354, 356.

The sprocket frame 60 is configured to be coupled to a rotatable shaft of the motor 38 and is further configured to hold the removable teeth 70, 80, 90, 100, 110 thereon. The sprocket frame 60 includes the central body 360, and ledge portions 370, 380, 390, 400, 410 that extend outwardly from an outer periphery of the central body 360. In an exemplary embodiment, the sprocket frame 60 is constructed of steel. Of course, in alternative embodiments, other materials known to those skilled in the art could be utilized to construct the sprocket frame 60.

The central body 360 includes a central aperture 361 extending therethrough that is configured to receive the insert bushing 350 therein. The thickness of the central body 360 is greater than a thickness of each of the ledge portions 370-410. In an exemplary embodiment, the central body 360 has a generally pentagonal shape.

The ledge portion 370 is configured to hold an extension portion of the removable tooth 70 thereon and includes apertures 470, 472 extending therethrough.

The ledge portion 380 is configured to hold an extension portion of the removable tooth 80 thereon and includes apertures 480, 482 extending therethrough.

The ledge portion 390 is configured to hold an extension portion of the removable tooth 90 thereon and includes apertures 490, 492 extending therethrough.

The ledge portion 400 is configured to hold an extension portion of the removable tooth 100 thereon and includes apertures 500, 502 extending therethrough.

The ledge portion 410 is configured to hold an extension portion of the removable tooth 110 thereon and includes apertures 510, 512 extending therethrough.

The removable teeth 70, 80, 90, 100, 110 are configured to be removably coupled to the ledge portions 370, 380, 390, 400, 410, respectively. The structure of the removable teeth 70, 80, 90, 100, 110 are identical to one another. Accordingly, for purposes of simplicity only the structure of the removable tooth 70 will be described in greater detail below.

Referring to FIGS. 7-11, the removable tooth 70 includes a tip portion 550, landing portions 562, 564, and an extension portion 566. The tip portion 550 has first and second sides 552, 554 and first and second ends 556, 558. The landing portion 562 extends from the first side 552 generally perpendicular to the first side 552 and is disposed proximate to the second end 558. The landing portion 564 extends from the second side 554 generally perpendicular to the second side 554 and is disposed proximate to the second end 558. The extension portion 566 extends from the second end 558 and has apertures 570, 572 extending therethrough.

Figure 8:
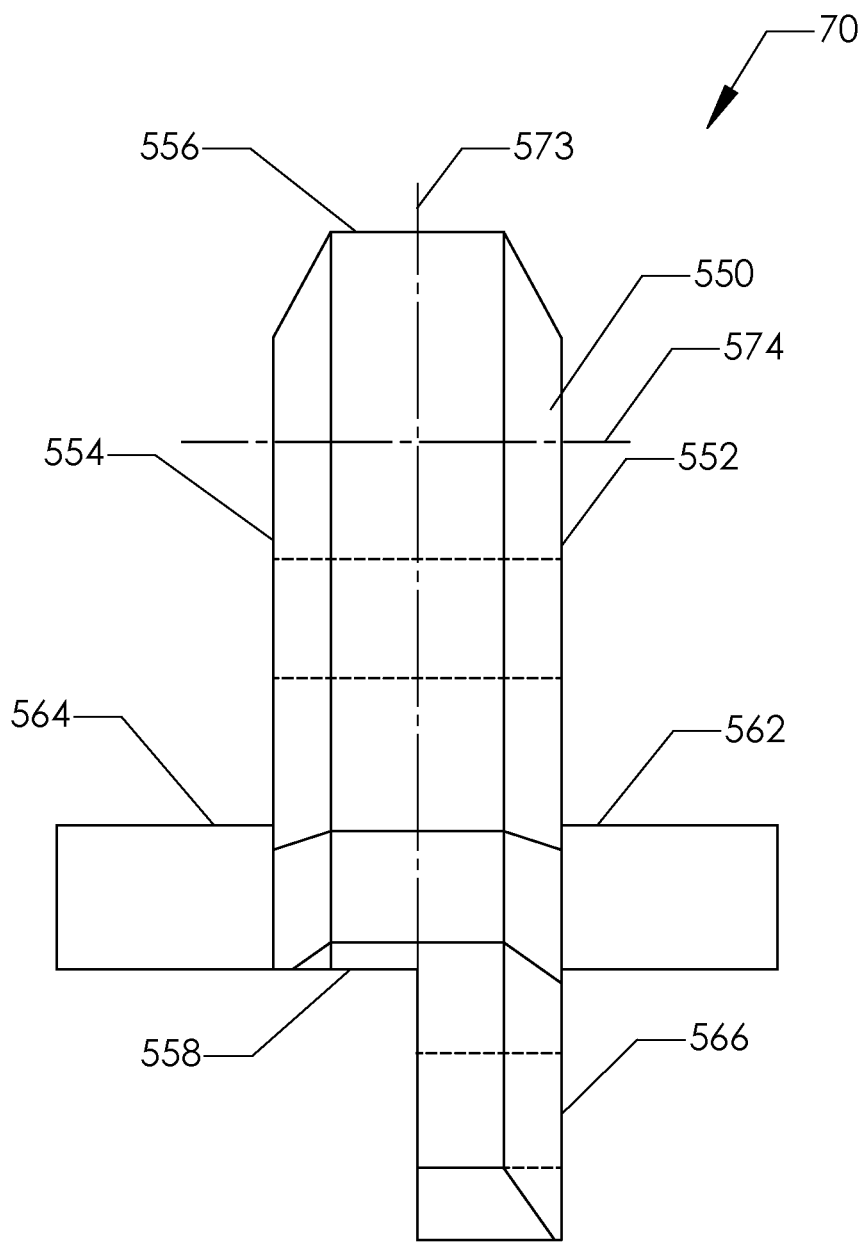
FIG. 8 is a schematic having a side view of the removable tooth of FIG. 7.
Figure 9:
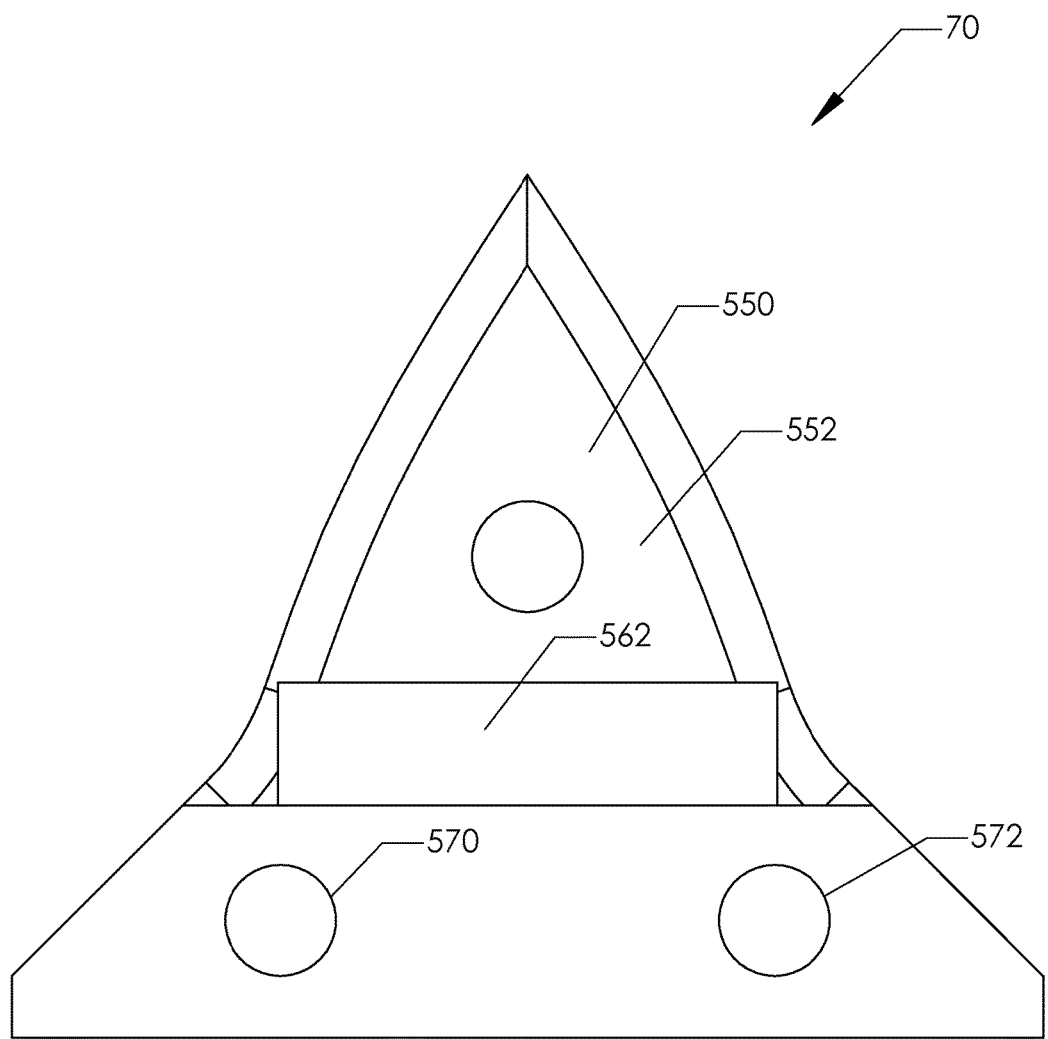
FIG. 9 is a schematic having a front view of the removable tooth of FIG. 7.
Figure 10:
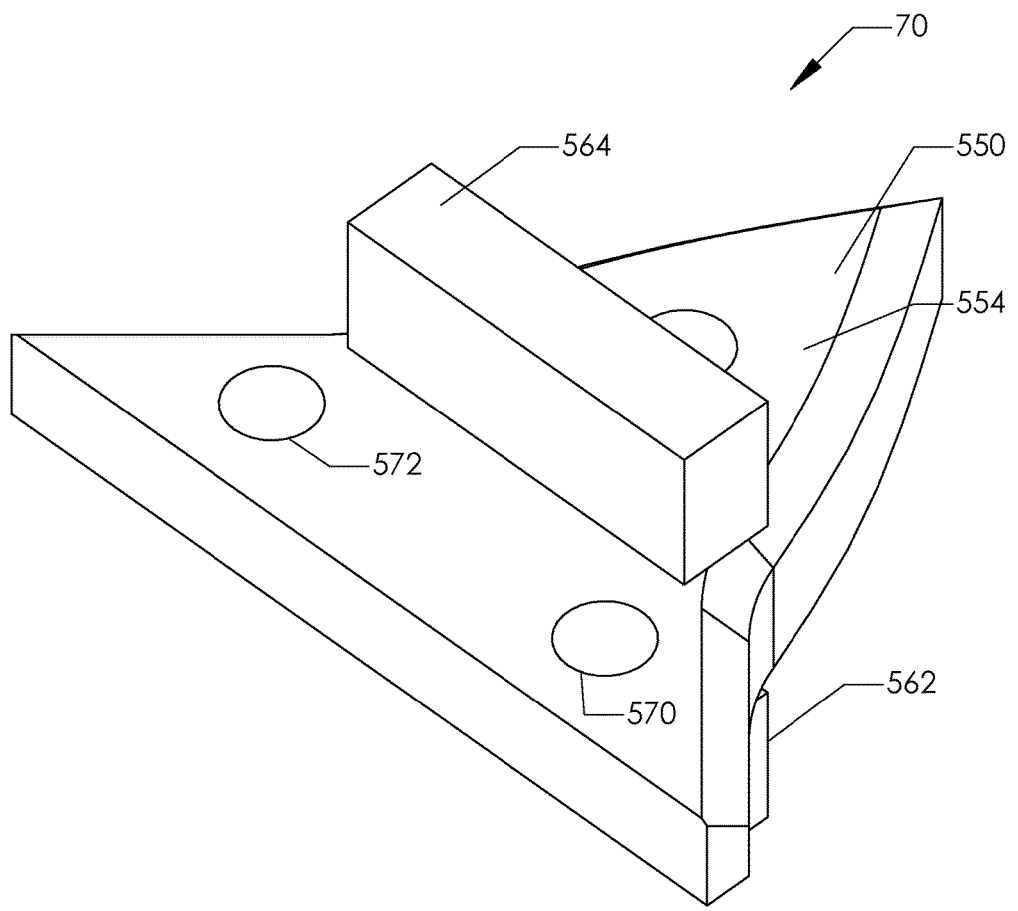
FIG. 10 is a schematic having another isometric view of the removable tooth of FIG. 7.
Figure 11:
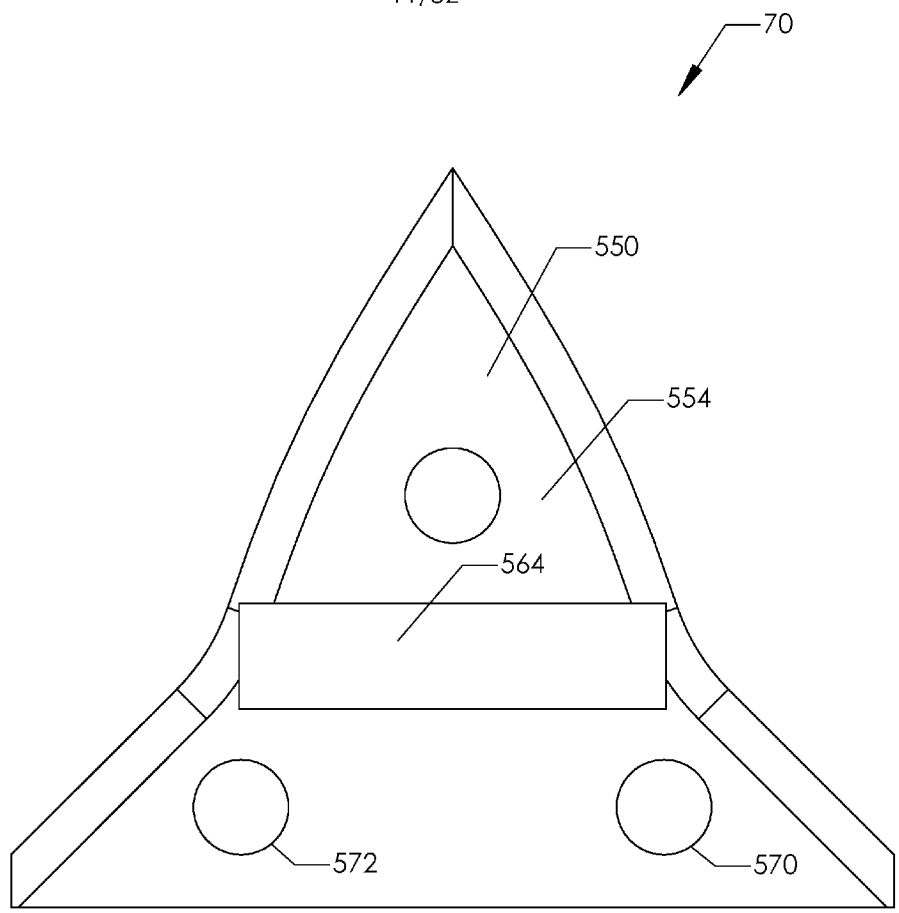
FIG. 11 is a schematic having a rear view of the removable tooth of FIG. 7.

Referring to FIG. 8, the tip portion 550 and the landing portions 562, 564 are configured to operably engage chain links thereon. A longitudinal axis 573 extends from the first end 556 to the second end 558 of the tip portion 550. The extension portion 556 extends from the second end 558 parallel to the longitudinal axis 573. An axis 574 extends between the first and second sides 552, 554 of the tip portion 550 generally perpendicular to the first and second sides 552, 554. A thickness of the tip portion 550 is substantially equal to a combined thickness of both the extension portion 566 and the ledge portion 370 in a direction parallel to the axis 574.

Figure 2:
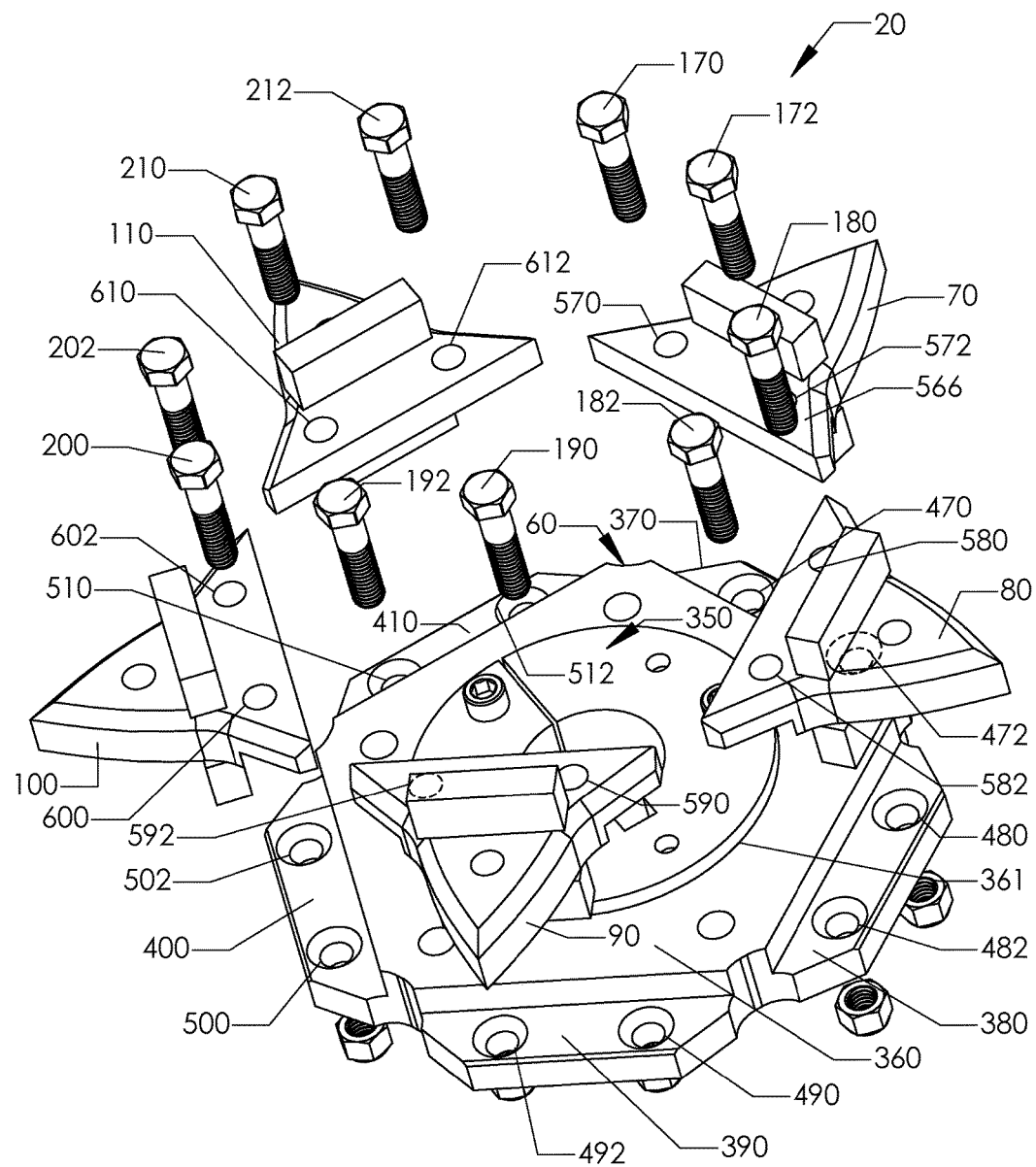
FIG. 2 is an exploded schematic of a sprocket assembly utilized in the car wash conveyor system of FIG. 1.
Figure 3:
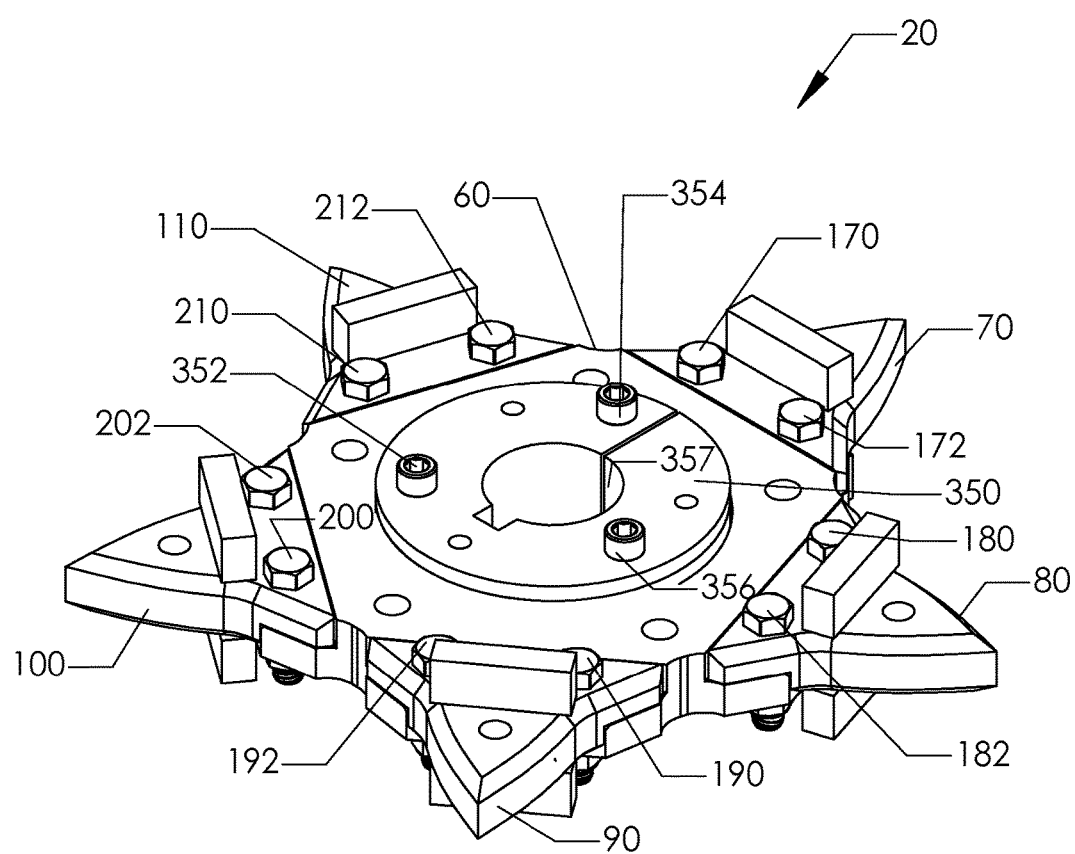
FIG. 3 is a schematic having an isometric view of the sprocket assembly of FIG. 2.
Figure 4:
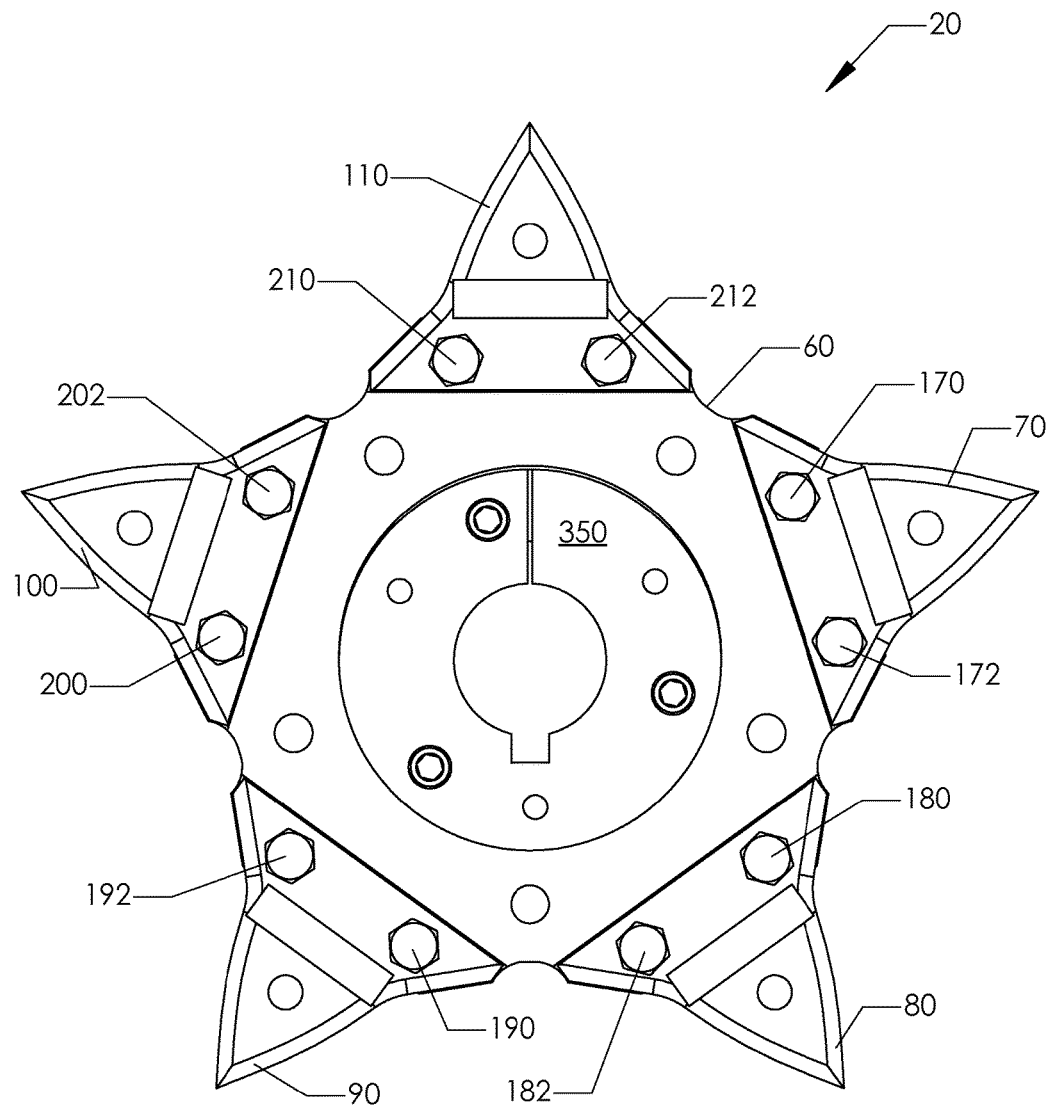
FIG. 4 is a schematic having a front view of the sprocket assembly of FIG. 2.
Figure 5:
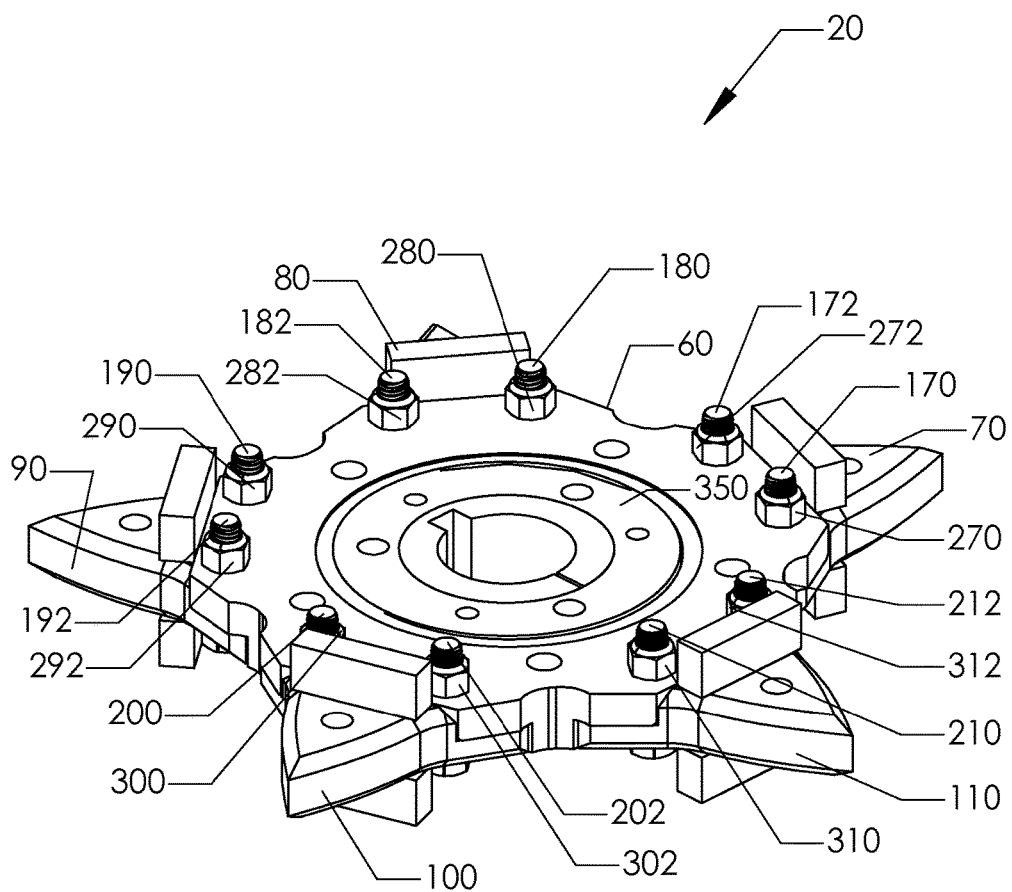
FIG. 5 is a schematic having another isometric view of the sprocket assembly of FIG. 2.
Figure 6:
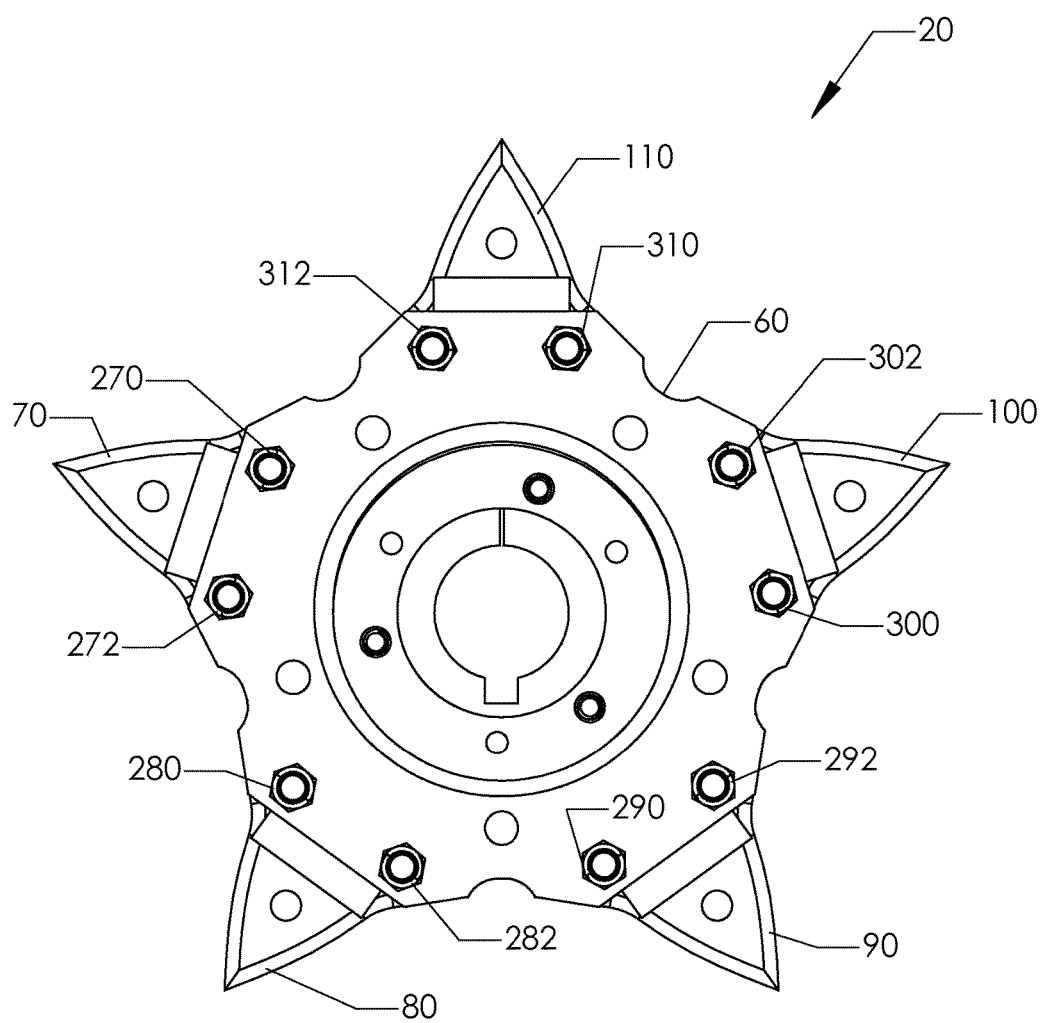
FIG. 6 is a schematic having a rear view of the sprocket assembly of FIG. 2.
Figure 7:
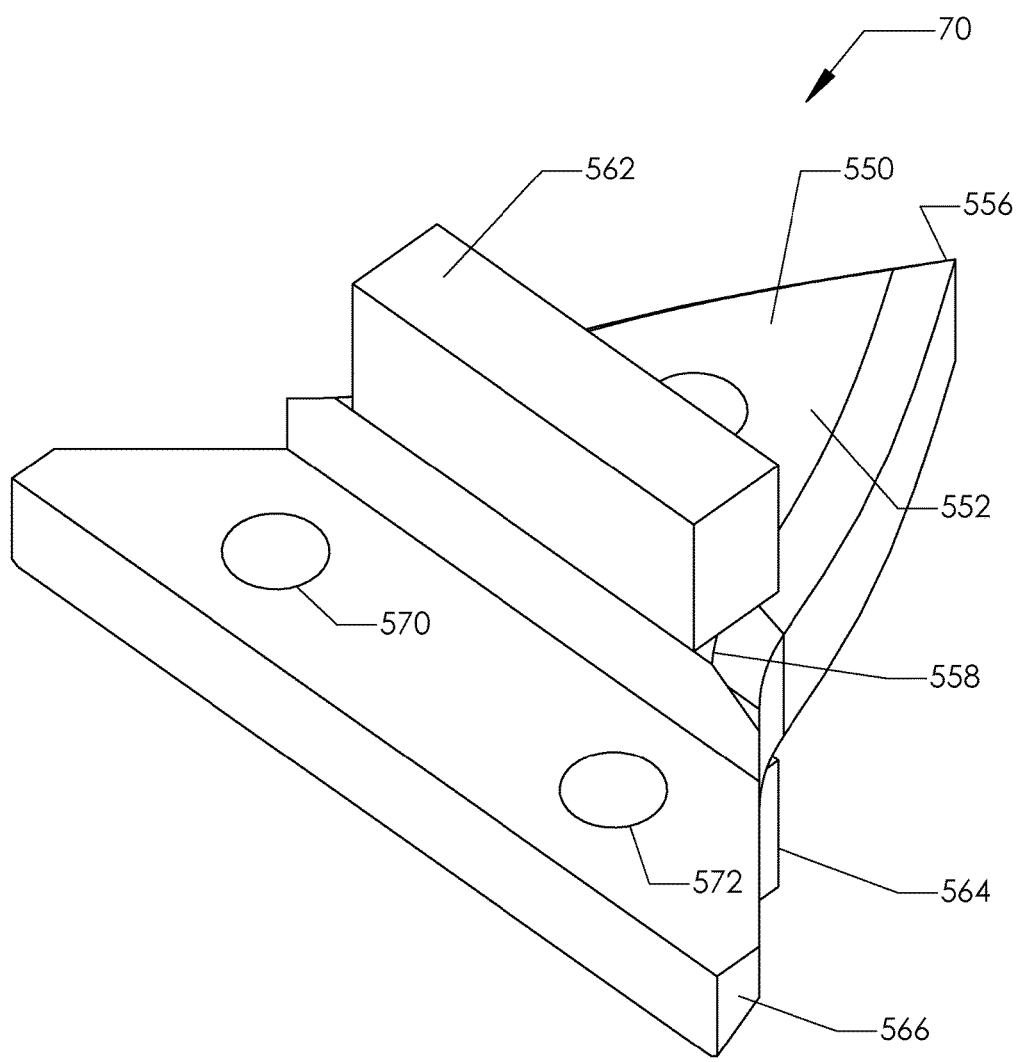
FIG. 7 is a schematic having an isometric view of a removable tooth utilized in the sprocket assembly of FIG. 2.

Referring to FIGS. 2 and 5, the bolts 170, 172 are configured to extend through the apertures 570, 572, respectively, in the extension portion 566 of the removable tooth 70, and through the apertures 470, 472, respectively, in the ledge portion 370. The bolts 170, 172 have corresponding threads that are threadably received in the nuts 270, 272, respectively, to removably couple the extension portion 566 to the ledge portion 370.

The bolts 180, 182 are configured to extend through the apertures 580, 582, respectively, in the extension portion of the removable tooth 80, and through the apertures 480, 482, respectively, in the ledge portion 380. The bolts 180, 182 have corresponding threads that are threadably received in the nuts 280, 282, respectively, to removably couple the extension portion of the removable tooth 80 to the ledge portion 380.

The bolts 190, 192 are configured to extend through the apertures 590, 592, respectively, in the extension portion of the removable tooth 90, and through the apertures 490, 492, respectively, in the ledge portion 390. The bolts 190, 192 have corresponding threads that are threadably received in the nuts 290, 292, respectively, to removably couple the extension portion of the removable tooth 90 to the ledge portion 390.

The bolts 200, 202 are configured to extend through the apertures 600, 602, respectively, in the extension portion of the removable tooth 100, and through the apertures 500, 502, respectively, in the ledge portion 400. The bolts 200, 202 have corresponding threads that are threadably received in the nuts 300, 302, respectively, to removably couple the extension portion of the removable tooth 100 to the ledge portion 400.

The bolts 210, 212 are configured to extend through the apertures 610, 612, respectively, in the extension portion of the removable tooth 110, and through the apertures 510, 512, respectively, in the ledge portion 410. The bolts 210, 212 have corresponding threads that are threadably received in the nuts 310, 312, respectively, to removably couple the extension portion of the removable tooth 110 to the ledge portion 410.

The insert bushing 350 is configured to be received within the central aperture 361 of the sprocket frame 60. In an exemplary embodiment, the insert bushing 350 is substantially split-ring-shaped and has an internal aperture 357 extending therethrough. In an exemplary embodiment, the insert bushing 350 is constructed of steel. The insert bushing 350 is fixedly coupled to the central body 360 of the sprocket frame 60 utilizing the bolts 352, 354, 356. A shaft of the motor 38 is received in the internal aperture 357 and is coupled to the insert bushing 350 such that rotation of the motor shaft causes rotation of the sprocket frame 60.

Referring to FIG. 1, the chain 32 includes a plurality of chain links 575 that are coupled together. At least one of the chain links 575 is operably coupled to the car wash roller assembly 34, and at least one of the chain links 575 is operably coupled to the car wash roller assembly 36. In an exemplary embodiment, the plurality of chain links 575 are constructed of steel.

Figure 12:
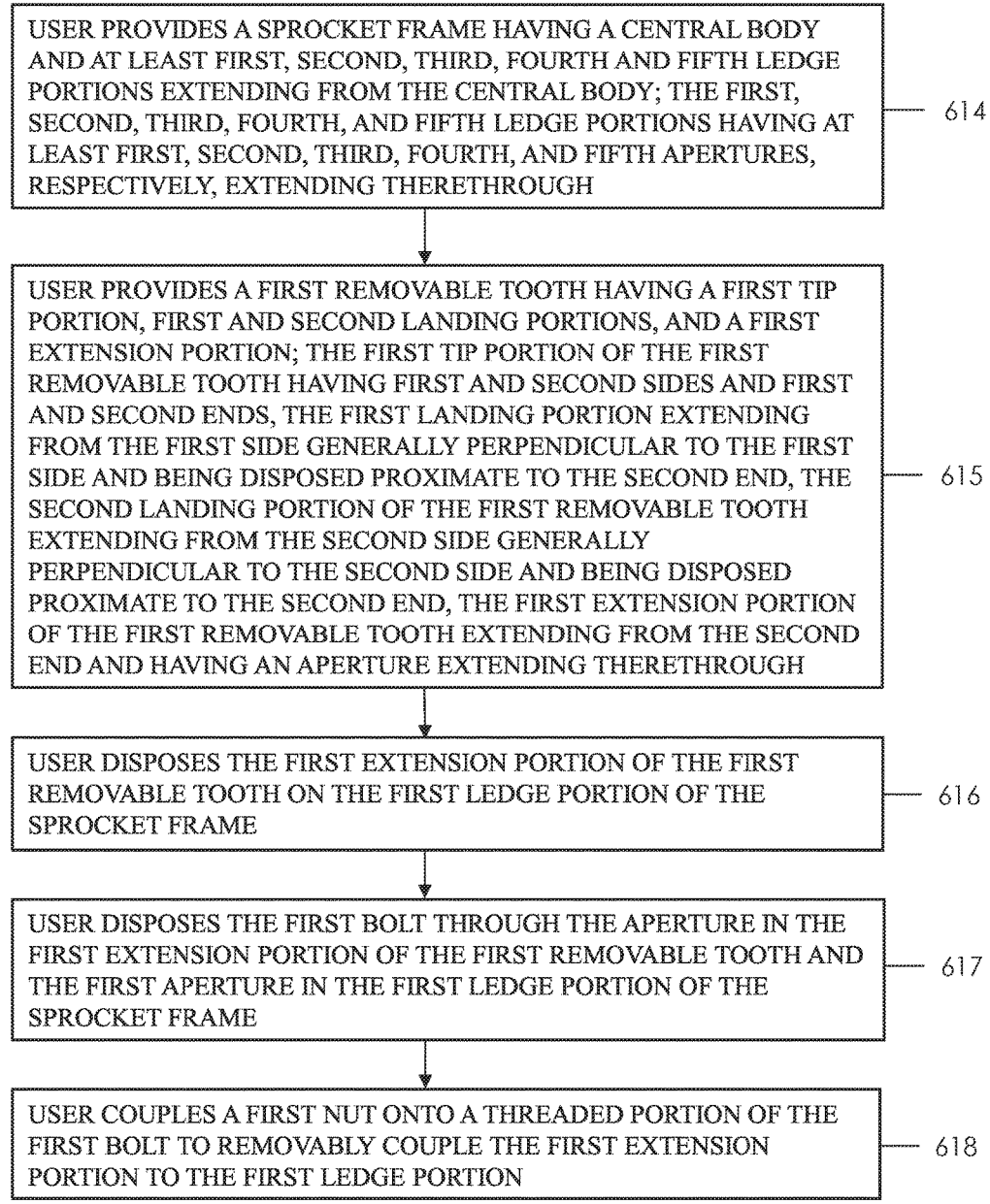
FIG. 12 is a flowchart of a method for installing the removable tooth of FIG. 7 on a sprocket frame in accordance with another exemplary embodiment.

Referring to FIGS. 1, 2 and 12, a flowchart of a method for installing a removable tooth on the sprocket frame 60 of the car wash conveyor system 10 in accordance with another exemplary embodiment will now be explained. For purposes of simplicity, only a single removable tooth 70 having a single aperture therethrough and a single bolt will be described in the below flowchart.

At step 614, the user provides the sprocket frame 60 having the central body 360 and at least ledge portions 370, 380, 390, 400, 410 extending from the central body 360. The ledge portions 370, 380, 390, 400, 410 have at least apertures 470, 480, 490, 500, 510, respectively, extending therethrough.

At step 615, the user provides the removable tooth 70 having the tip portion 550, landing portions 562, 564, and the extension portion 566. The tip portion 550 of the removable tooth 70 has first and second sides 552, 554 and first and second ends 556, 558. The landing portion 562 extends from the first side 552 generally perpendicular to the first side 552 and is disposed proximate to the second end 558. The landing portion 564 of the removable tooth 70 extends from the second side 554 generally perpendicular to the second side 554 and is disposed proximate to the second end 558. The extension portion 566 of the removable tooth 70 extends from the second end 558 and has an aperture 570 extending therethrough.

At step 616, the user disposes the extension portion 566 of the removable tooth 70 on the ledge portion 370 of the sprocket frame 60.

At step 617, the user disposes the bolt 770 through the aperture 570 in the extension portion 566 of the removable tooth 70 and the aperture 470 in the ledge portion 370 of the sprocket frame 60.

At step 618, the user couples the nut 270 onto a threaded portion of the bolt 770 to removably couple the extension portion 566 to the ledge portion 370.

Figure 13:
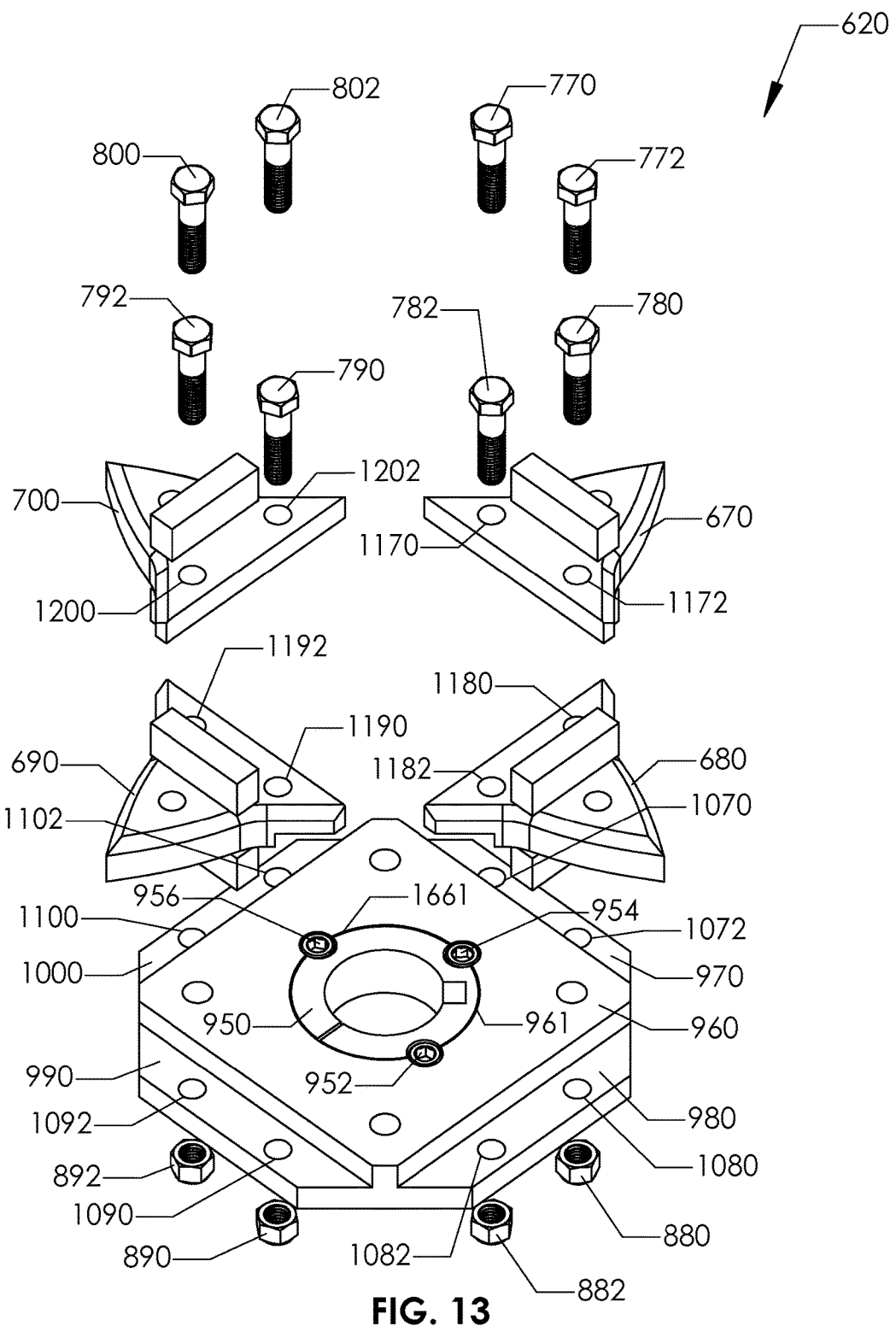
FIG. 13 is an exploded schematic of another sprocket assembly in accordance with another exemplary embodiment.
Figure 14:
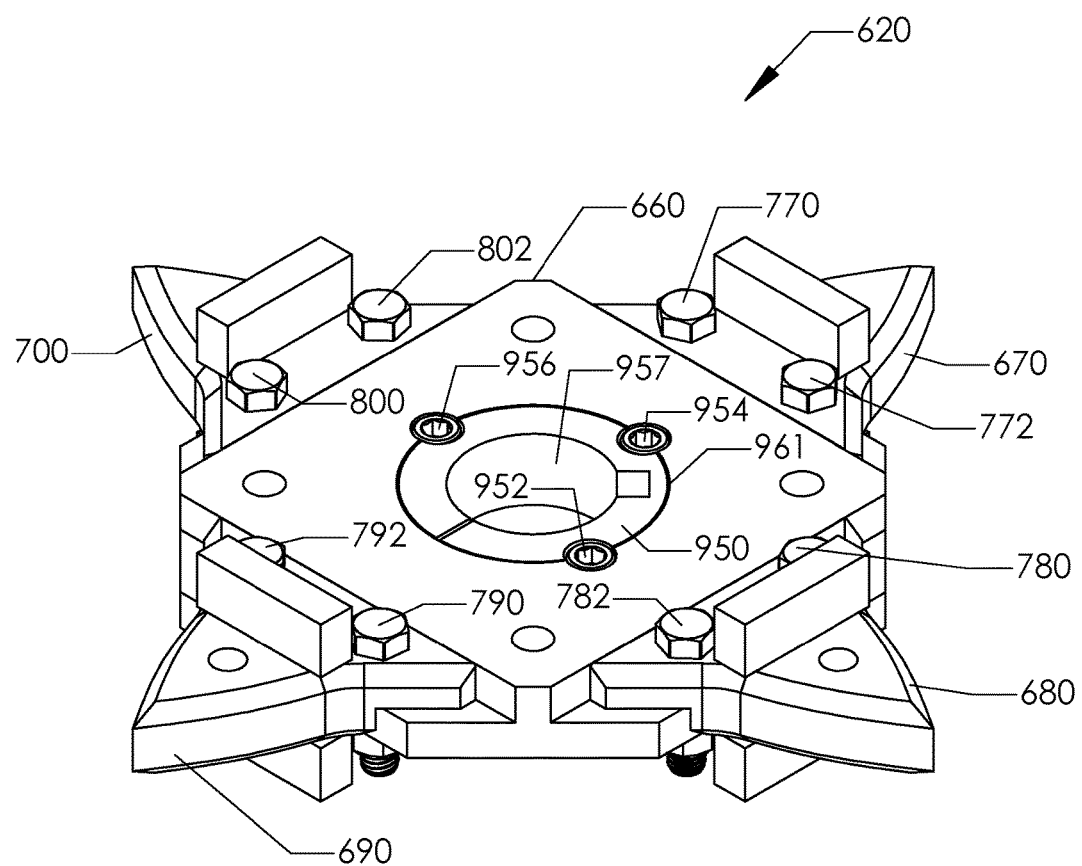
FIG. 14 is a schematic having an isometric view of the sprocket assembly of FIG. 13.
Figure 15:
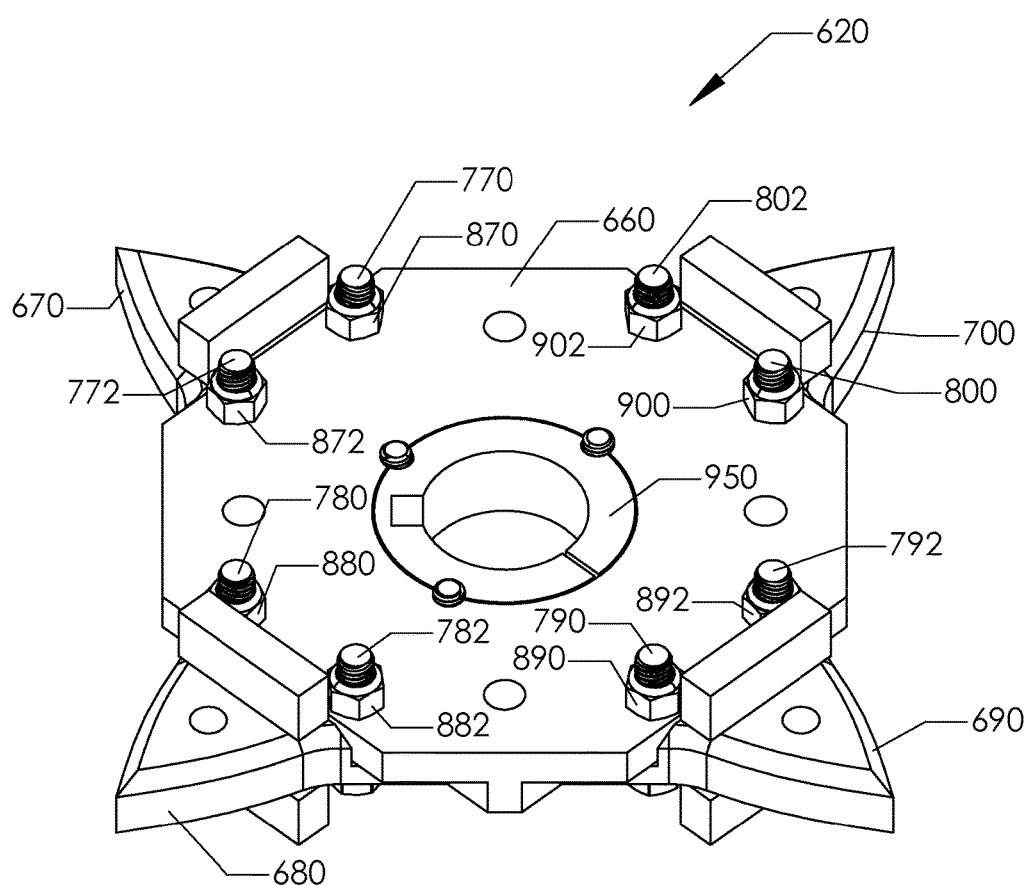
FIG. 15 is a schematic having another isometric view of the sprocket assembly of FIG. 13.

Referring to FIGS. 13-15, another sprocket assembly 620 that could be operably coupled to a chain to move the car wash roller assembly 34 and the car wash roller assembly 36 in accordance with another exemplary embodiment will be described. The sprocket assembly 620 includes a sprocket frame 660, a removable tooth 670, a removable tooth 680, a removable tooth 690, a removable tooth 700, bolts 770, 772, 780, 782, 790, 792, 800, 802, nuts 870, 872, 880, 882, 890, 892, 900, 902, an insert bushing 950, and bolts 952, 954, 956.

The sprocket frame 660 is configured to be coupled to a rotatable shaft of the motor 38 and is further configured to hold the removable teeth 670, 680, 690, 700 thereon. The sprocket frame 660 includes the central body 960, and ledge portions 970, 980, 990, 1000 that extend outwardly from an outer periphery of the central body 960. In an exemplary embodiment, the sprocket frame 660 is constructed of steel. Of course, in alternative embodiments, other materials known to those skilled in the art could be utilized to construct the sprocket frame 660.

The central body 960 includes a central aperture 961 extending therethrough that is configured to receive the insert bushing 950 therein. The thickness of the central body 960 is greater than a thickness of each of the ledge portions 970-1000. In an exemplary embodiment, the central body 960 is generally square-shaped. The ledge portions 970, 990 extend generally parallel to one another. The ledge portions 980, 1000 extend generally parallel to one another and perpendicular to the ledge portions 970, 990.

The ledge portion 970 is configured to hold an extension portion of the removable tooth 670 thereon and includes apertures 1070, 1072 extending therethrough.

The ledge portion 980 is configured to hold an extension portion of the removable tooth 680 thereon and includes apertures 1080, 1082 extending therethrough.

The ledge portion 990 is configured to hold an extension portion of the removable tooth 690 thereon and includes apertures 1090, 1092 extending therethrough.

The ledge portion 1000 is configured to hold an extension portion of the removable tooth 700 thereon and includes apertures 1100, 1102 extending therethrough.

The removable teeth 670, 680, 690, 700 are configured to be removably coupled to the ledge portions 970, 980, 990, 1000, respectively. The structure of the removable teeth 670, 680, 690, 700 are identical to the structure of removable tooth 70 described above.

Referring to FIGS. 13 and 15, the bolts 770, 772 are configured to extend through the apertures 1170, 1172, respectively, in the extension portion of the removable tooth 670, and through the apertures 1070, 1072, respectively, in the ledge portion 970. The bolts 770, 772 have corresponding threads that are threadably received in the nuts 870, 872, respectively, to removably couple the extension portion of the removable tooth 670 to the ledge portion 970.

The bolts 780, 782 are configured to extend through the apertures 1180, 1182, respectively, in the extension portion of the removable tooth 680, and through the apertures 1080, 1082, respectively, in the ledge portion 980. The bolts 780, 782 have corresponding threads that are threadably received in the nuts 880, 882, respectively, to removably couple the extension portion of the removable tooth 680 to the ledge portion 980.

The bolts 790, 792 are configured to extend through the apertures 1190, 1192, respectively, in the extension portion of the removable tooth 690, and through the apertures 1090, 1092, respectively, in the ledge portion 990. The bolts 790, 792 have corresponding threads that are threadably received in the nuts 890, 892, respectively, to removably couple the extension portion of the removable tooth 690 to the ledge portion 990.

The bolts 800, 802 are configured to extend through the apertures 1200, 1202, respectively, in the extension portion of the removable tooth 700, and through the apertures 1100, 1102, respectively, in the ledge portion 1000. The bolts 800, 802 have corresponding threads that are threadably received in the nuts 900, 902, respectively, to removably couple the extension portion of the removable tooth 700 to the ledge portion 1000.

The insert bushing 950 is configured to be received within the central aperture 961 of the sprocket frame 660. In an exemplary embodiment, the insert bushing 950 is substantially split-ring-shaped and has an internal aperture 957 extending therethrough. In an exemplary embodiment, the insert bushing 950 is constructed of steel. The insert bushing 950 is fixedly coupled to the central body 960 of the sprocket frame 660 utilizing the bolts 952, 954, 956. A shaft of the motor 38 is received in the internal aperture 957 and is coupled to the insert bushing 950 such that rotation of the motor shaft causes rotation of the sprocket frame 660.

Referring to FIGS. 16-19, a car wash conveyor system 1310 in accordance with another exemplary embodiment is provided. The car wash conveyor system 1310 includes a sprocket assembly 1320, a sprocket assembly 1330, a chain 1332, a car wash roller assembly 1334, a car wash roller assembly 1336, a motor 1338, and a motor controller 1340. An advantage of the sprocket assembly 1320 is that the sprocket assembly 1320 utilizes removable teeth that are configured to be readily replaced when the removable teeth become degraded.

The motor 1338 has a shaft (not shown) that rotates the sprocket assembly 1320 in response to receiving control signals from the motor controller 1340. When the sprocket assembly 1320 rotates in a first rotational direction, removable teeth in the sprocket assembly 1320 operably engage chain links in the chain 1332 to move the chain 1332 in a predetermined direction. In response to the movement of the chain 1332 in the predetermined direction, car wash roller assemblies 1334, 1336 that are coupled to the chain 1332 move along with the chain 1332. Further, the sprocket assembly 1330 operably engages chain links in the chain 1332 and rotates in the first rotational direction response to the movement of the chain 1332.

The sprocket assemblies 1320, 1330 have an identical structure to one another. Accordingly, only the structure of the sprocket assembly 1320 will be described in greater detail below. The sprocket assembly 1320 includes a sprocket frame 1360, a removable tooth 1370, a removable tooth 1380, a removable tooth 1390, a removable tooth 1400, bolts 1470, 1472, 1480, 1482, 1490, 1492, 1500, 1502, nuts 1570, 1572, 1580, 1582, 1590, 1592, 1600, 1602, an insert bushing 1650, and bolts 1652, 1654, 1656.

The sprocket frame 1360 is configured to be coupled to a rotatable shaft of the motor 1338 and is further configured to hold the removable plastic teeth 1370, 1380, 1390, 1400 thereon. The sprocket frame 1360 includes the central body 1660, and ledge portions 1670, 1680, 1690, 1700 that extend outwardly from an outer periphery of the central body 1660. In an exemplary embodiment, the sprocket frame 1660 is constructed of plastic. Of course, in alternative embodiments, other materials known to those skilled in the art could be utilized to construct the sprocket frame 1660.

The central body 1660 includes a central aperture 1661 extending therethrough that is configured to receive the insert bushing 1650 therein. The thickness of the central body 1660 is greater than a thickness of each of the ledge portions 1670-1700. In an exemplary embodiment, the central body 1660 is generally square-shaped. Also, the ledge portions 1670, 1690 extend generally parallel to one another. The ledge portions 1680, 1700 extend generally parallel to one another and perpendicular to the ledge portions 1670, 1690.

The ledge portion 1670 is configured to hold an extension portion of the removable tooth 1370 thereon and includes apertures 1770, 1772 extending therethrough.

The ledge portion 1680 is configured to hold an extension portion of the removable tooth 1380 thereon and includes apertures 1780, 1782 extending therethrough.

The ledge portion 1690 is configured to hold an extension portion of the removable tooth 1390 thereon and includes apertures 1790, 1792 extending therethrough.

The ledge portion 1700 is configured to hold an extension portion of the removable tooth 1400 thereon and includes apertures 1800, 1802 extending therethrough.

The removable plastic teeth 1370, 1380, 1390, 1400 are configured to be removably coupled to the ledge portions 1670, 1680, 1690, 1700, respectively. The structure of the removable plastic teeth 1370, 1380, 1390, 1400 are identical to one another. Accordingly, for purposes of simplicity only the structure of the removable tooth 1370 will be described in greater detail below.

The removable plastic tooth 1370 includes a tip portion 1850 and an extension portion 1866. The tip portion 1850 of the removable plastic tooth 1370 has first and second sides 1852, 1854 and first and second ends 1856, 1858. The extension portion 1866 of the removable plastic tooth 1370 extends from the second end 1858 and has the apertures 1870, 1872 extending therethrough.

The tip portion 1850 is configured to engage a chain link thereon. A longitudinal axis 1873 (shown in FIG. 19) extends from the first end 1856 to the second end 1858 of the tip portion 1850. The extension portion 1866 extends from the second end 1858 parallel to the longitudinal axis 1873. An axis 1874 (shown in FIG. 17) extends between the first and second sides 1852, 1854 of the tip portion 1850 of the removable plastic tooth 1370 generally perpendicular to the first and second sides 1852, 1854. A thickness of the tip portion 1850 is substantially equal to a combined thickness of both the extension portion 1866 and the ledge portion 1670 in a direction parallel to the axis 1874.

Figure 17:
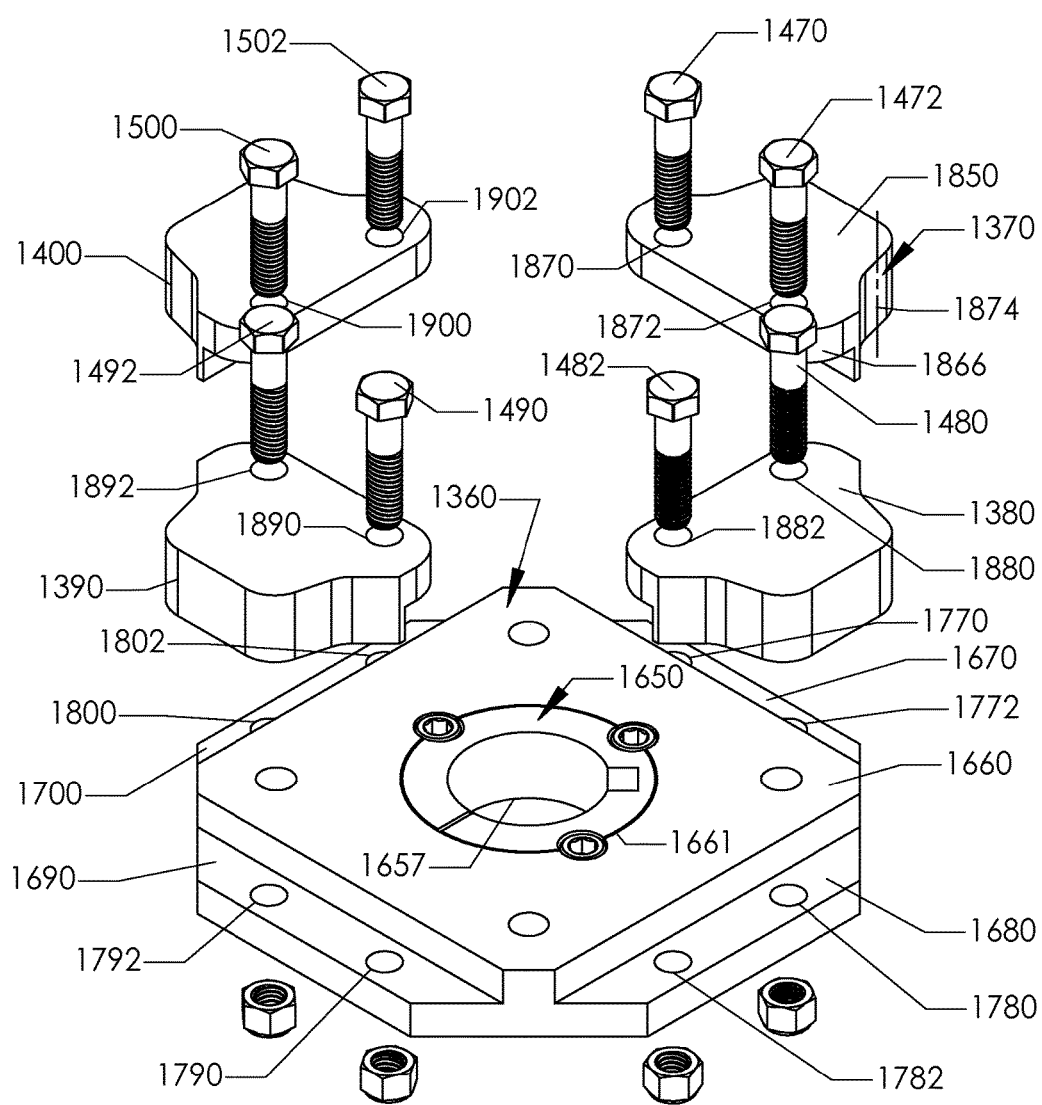
FIG. 17 is an exploded schematic of a sprocket assembly utilized in the car wash conveyor system of FIG. 16.
Figure 18:
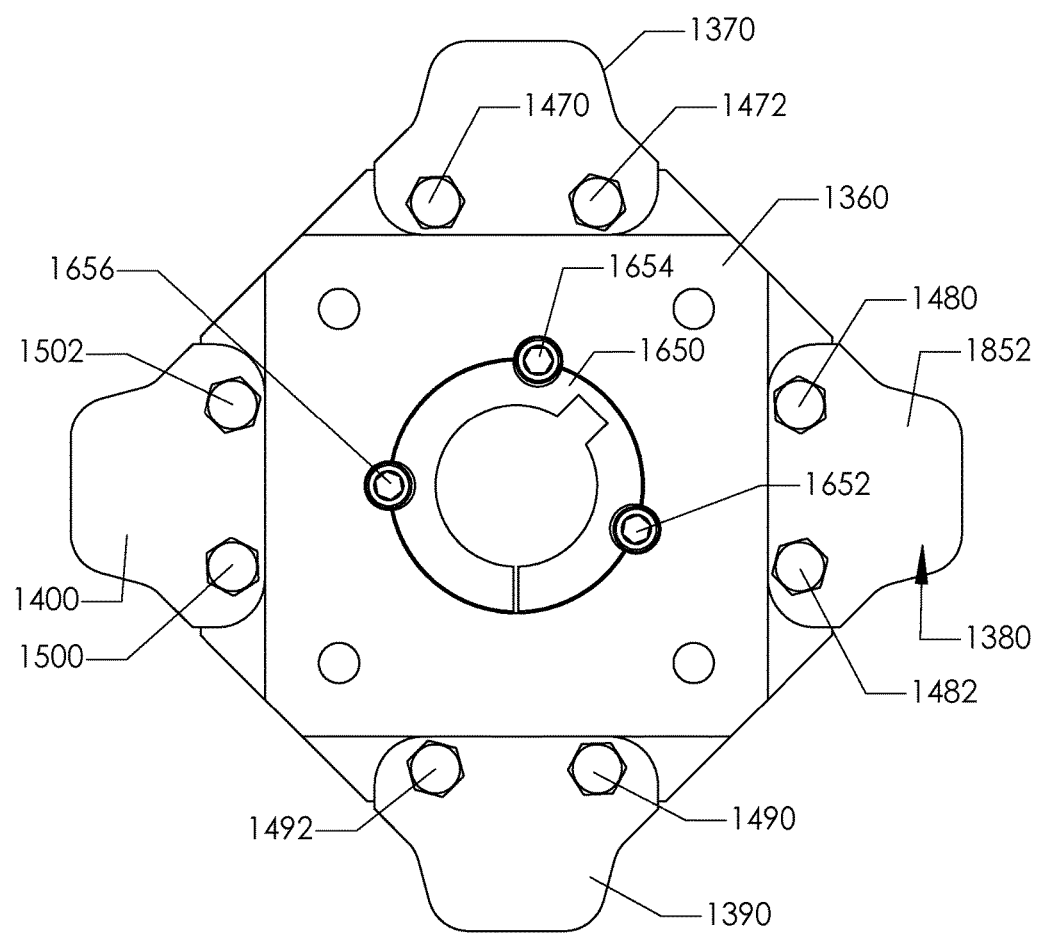
FIG. 18 is a schematic having a front view of the sprocket assembly of FIG. 17.
Figure 19:
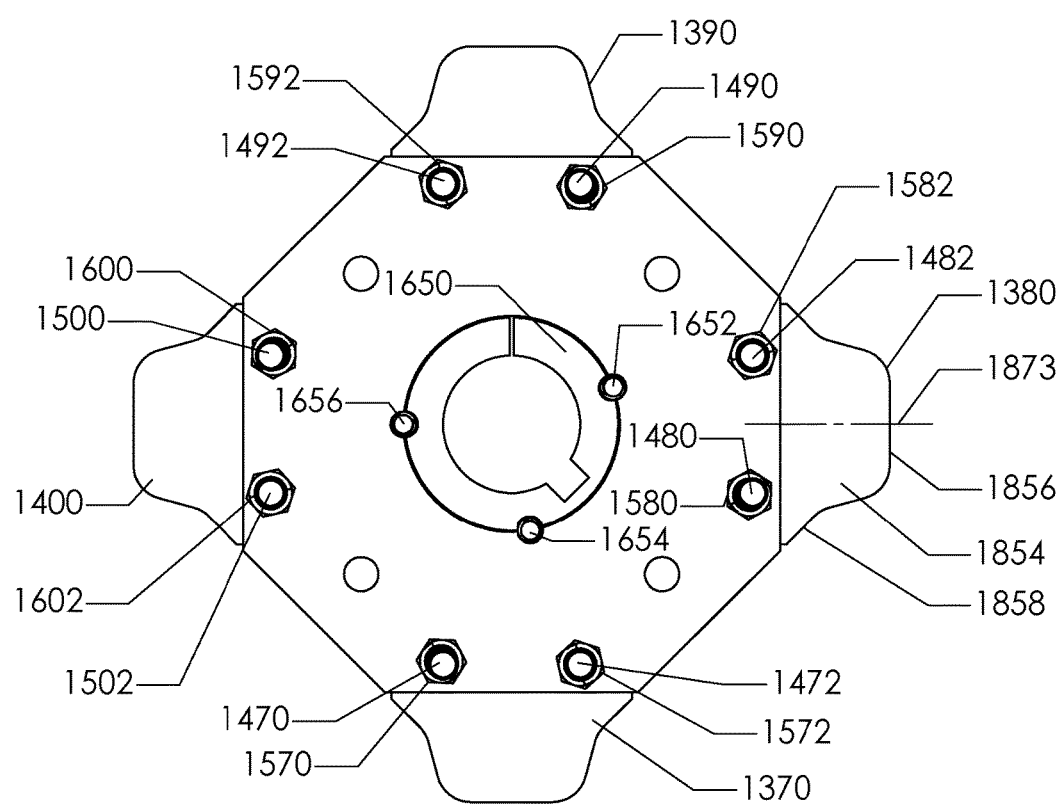
FIG. 19 is a schematic having a rear view of the sprocket assembly of FIG. 17.

Referring to FIGS. 17 and 19, the bolts 1470, 1472 are configured to extend through the apertures 1870, 1872, respectively, in the extension portion 1866 of the removable plastic tooth 1370, and through the apertures 1770, 1772, respectively, in the ledge portion 1670. The bolts 1470, 1472 have corresponding threads that are threadably received in the nuts 1570, 1572, respectively, to removably couple the extension portion 1866 to the ledge portion 1670.

The bolts 1480, 1482 are configured to extend through the apertures 1880, 1882, respectively, in the extension portion of the removable tooth 1380, and through the apertures 1780, 1782, respectively, in the ledge portion 1680. The bolts 1480, 1482 have corresponding threads that are threadably received in the nuts 1580, 1582, respectively, to removably couple the extension portion of the removable tooth 1380 to the ledge portion 1680.

The bolts 1490, 1492 are configured to extend through the apertures 1890, 1892, respectively, in the extension portion of the removable tooth 1390, and through the apertures 1790, 1792, respectively, in the ledge portion 1690. The bolts 1490, 1492 have corresponding threads that are threadably received in the nuts 1590, 1592, respectively, to removably couple the extension portion of the removable tooth 1390 to the ledge portion 1690.

The bolts 1500, 1502 are configured to extend through the apertures 1900, 1902, respectively, in the extension portion of the removable tooth 1400, and through the apertures 1800, 1802, respectively, in the ledge portion 1700. The bolts 1500, 1502 have corresponding threads that are threadably received in the nuts 1600, 1602, respectively, to removably couple the extension portion of the removable tooth 1400 to the ledge portion 1700.

The insert bushing 1650 is configured to be received within the central aperture 1661 of the sprocket frame 1360. In an exemplary embodiment, the insert bushing 1650 is substantially split-ring-shaped and has an internal aperture 1657 extending therethrough. In an exemplary embodiment, the insert bushing 1650 is constructed of steel. The insert bushing 1650 is fixedly coupled to the central body 1660 of the sprocket frame 1360 utilizing the bolts 1652, 1654, 1656. A shaft of the motor 1338 is received in the internal aperture 1657 and is coupled to the insert bushing 1650 such that rotation of the motor shaft causes rotation of the sprocket frame 1360.

Figure 16:
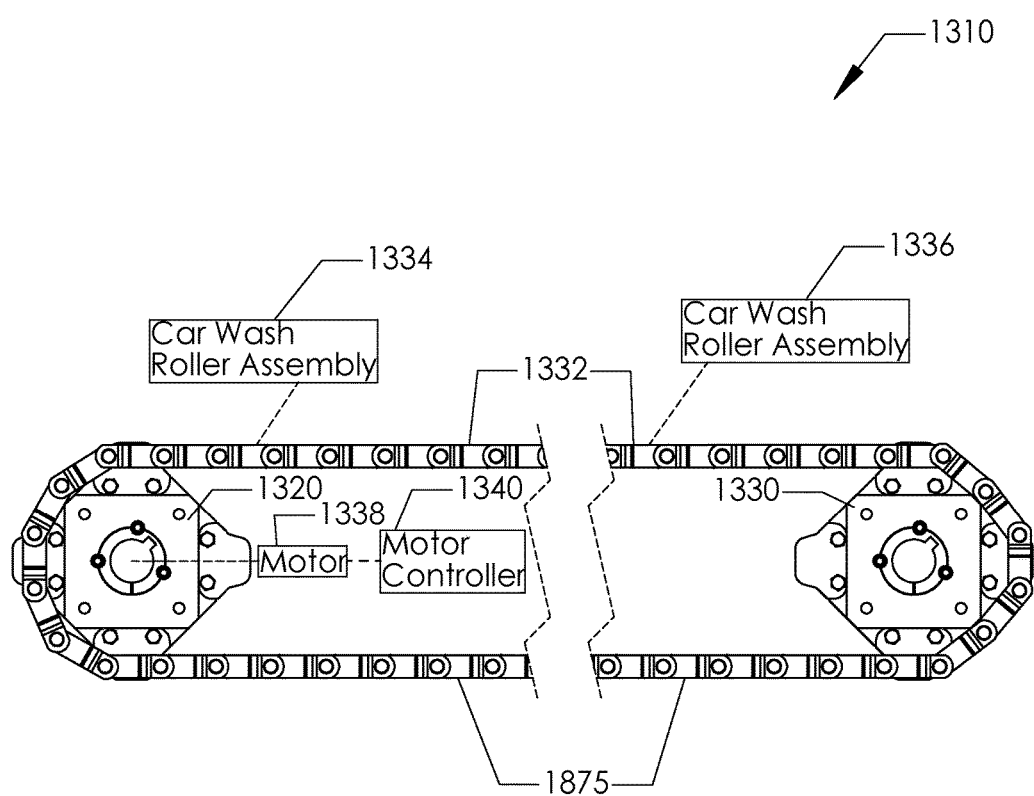
FIG. 16 is a schematic of another car wash conveyor system in accordance with another exemplary embodiment.

Referring to FIG. 16, the chain 1332 includes a plurality of chain links 1875 that are coupled together. At least one of the chain links 1875 is operably coupled to the car wash roller assembly 1334, and at least one of the chain links 575 is operably coupled to the car wash roller assembly 1336. In an exemplary embodiment, the plurality of chain links 1875 are constructed of plastic.

Figure 20:
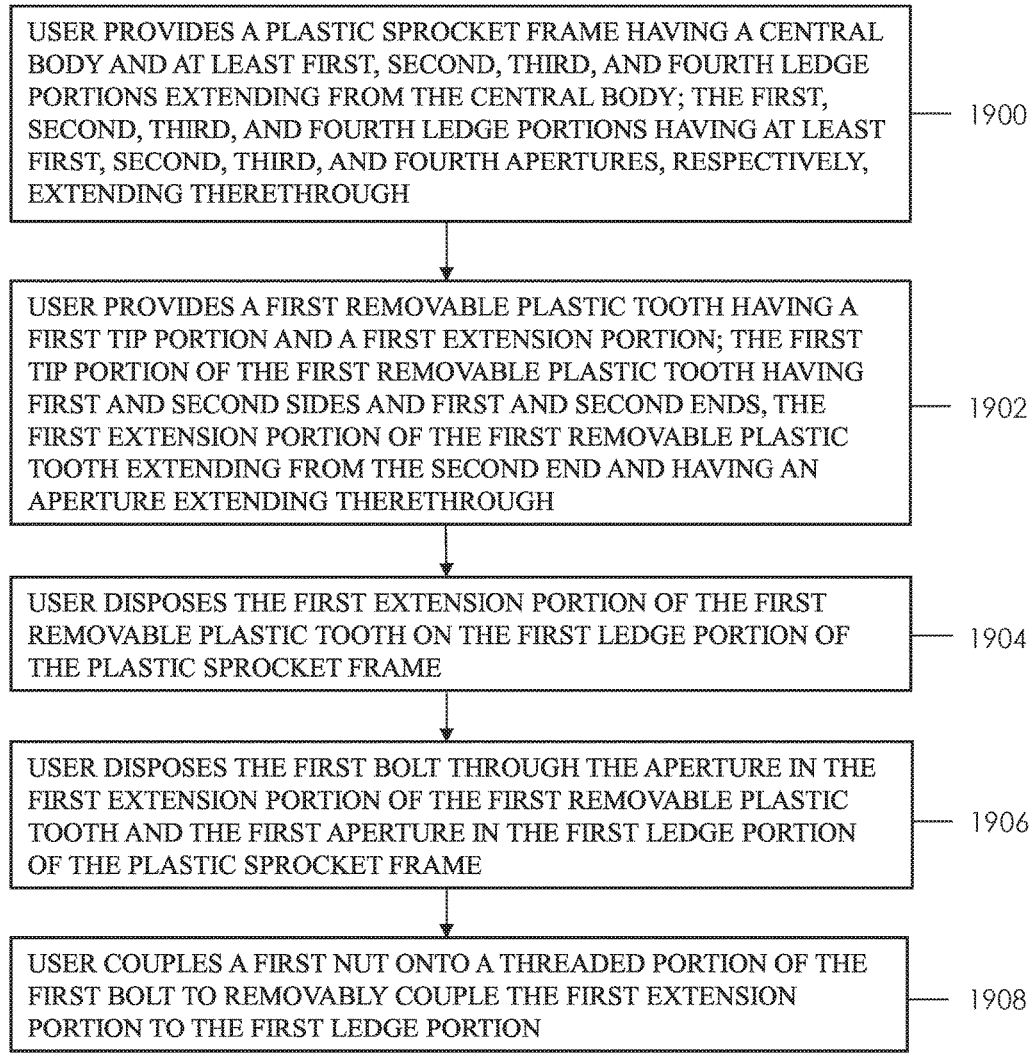
FIG. 20 is a flowchart of a method for installing a removable tooth on a sprocket frame in accordance with another exemplary embodiment.

Referring to FIG. 20, a flowchart of a method for installing a removable plastic tooth on the sprocket frame 1360 of the car wash conveyor system 1310 in accordance with another exemplary embodiment will now be explained. For purposes of simplicity, only a single removable plastic tooth 1370 having a single aperture therethrough and a single bolt will be described in the below flowchart.

At step 1900, the user provides the plastic sprocket frame 1360 having the central body 1660 and at least ledge portions 1670, 1680, 1690, 1700 extending from the central body 1660. The ledge portions 1670, 1680, 1690, 1700 have at least apertures 1770, 1780, 1790, 1800, respectively, extending therethrough.

At step 1902, the user provides the removable plastic tooth 1370 having the tip portion 1850 and the extension portion 1866. The tip portion 1850 of the removable plastic tooth 1370 has first and second sides 1852, 1854 and first and second ends 1856, 1858. The extension portion 1866 of the removable plastic tooth 1370 extends from the second end 1858 and has the aperture 1870 extending therethrough.

At step 1904, the user disposes the extension portion 1866 of the removable plastic tooth 1370 on the ledge portion 1670 of the plastic sprocket frame 1360.

At step 1906, the user disposes the bolt 1470 through the aperture 1870 in the extension portion 1866 of the removable plastic tooth 1370 and the aperture 1770 in the ledge portion 1670 of the plastic sprocket frame 1370.

At step 1908, user couples the nut 1570 onto a threaded portion of the bolt 1470 to removably couple the extension portion 1866 to the ledge portion 1670.

Figure 21:
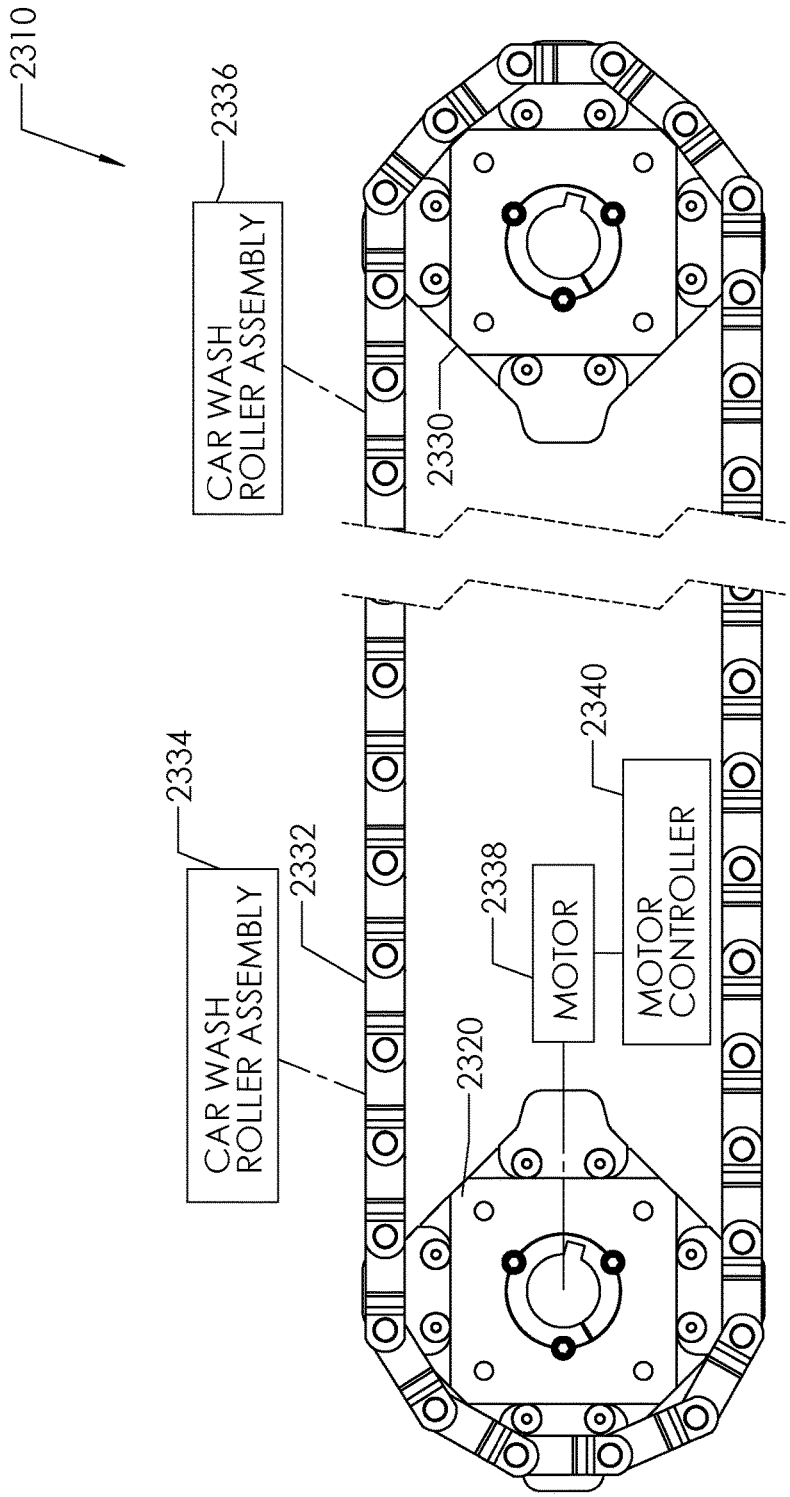
FIG. 21 is a schematic of another car wash conveyor system in accordance with another exemplary embodiment.
Figure 22:
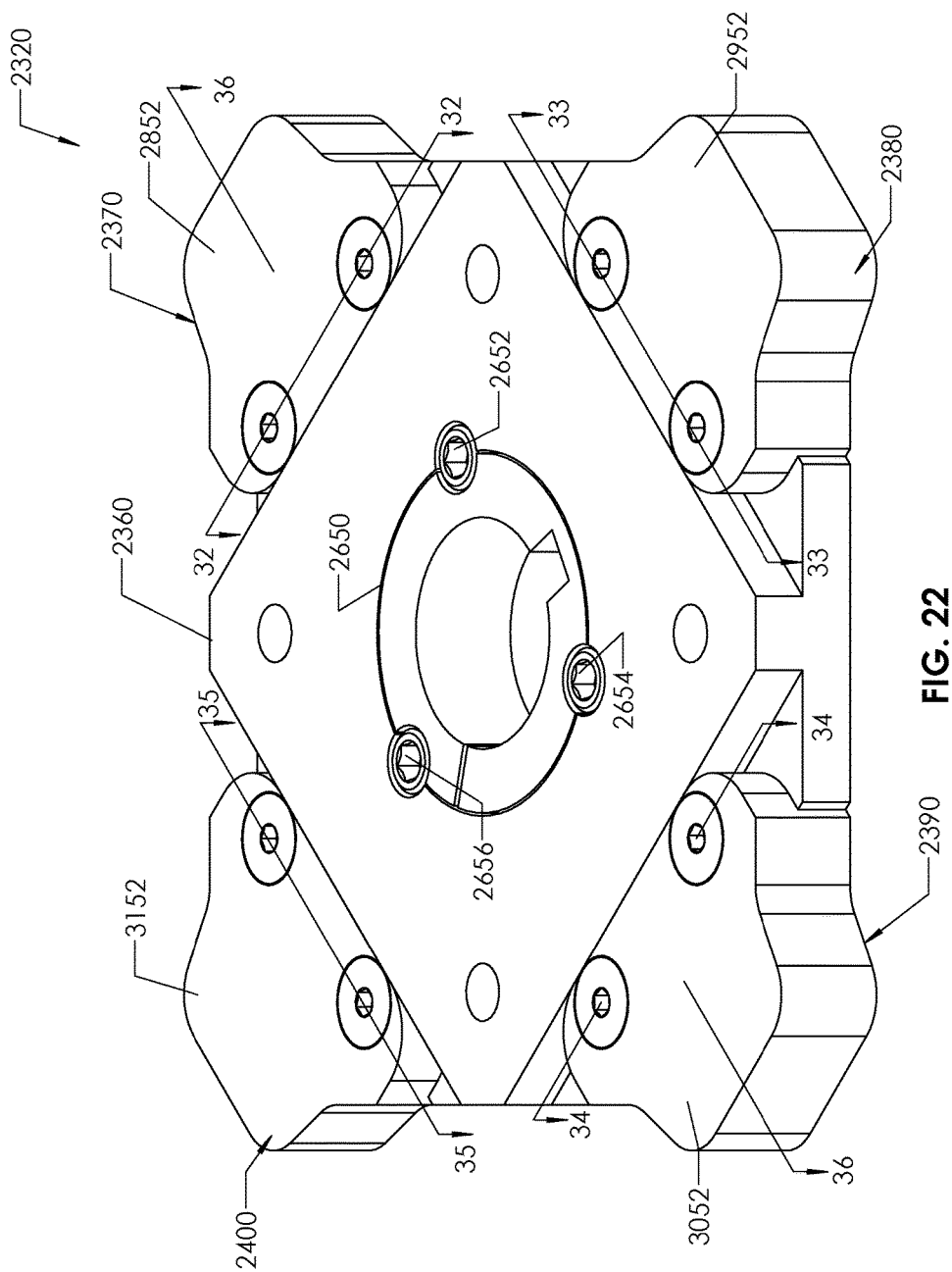
FIG. 22 is a schematic having an isometric view of a sprocket assembly utilized in the car wash conveyor system of FIG. 21.
Figure 23:
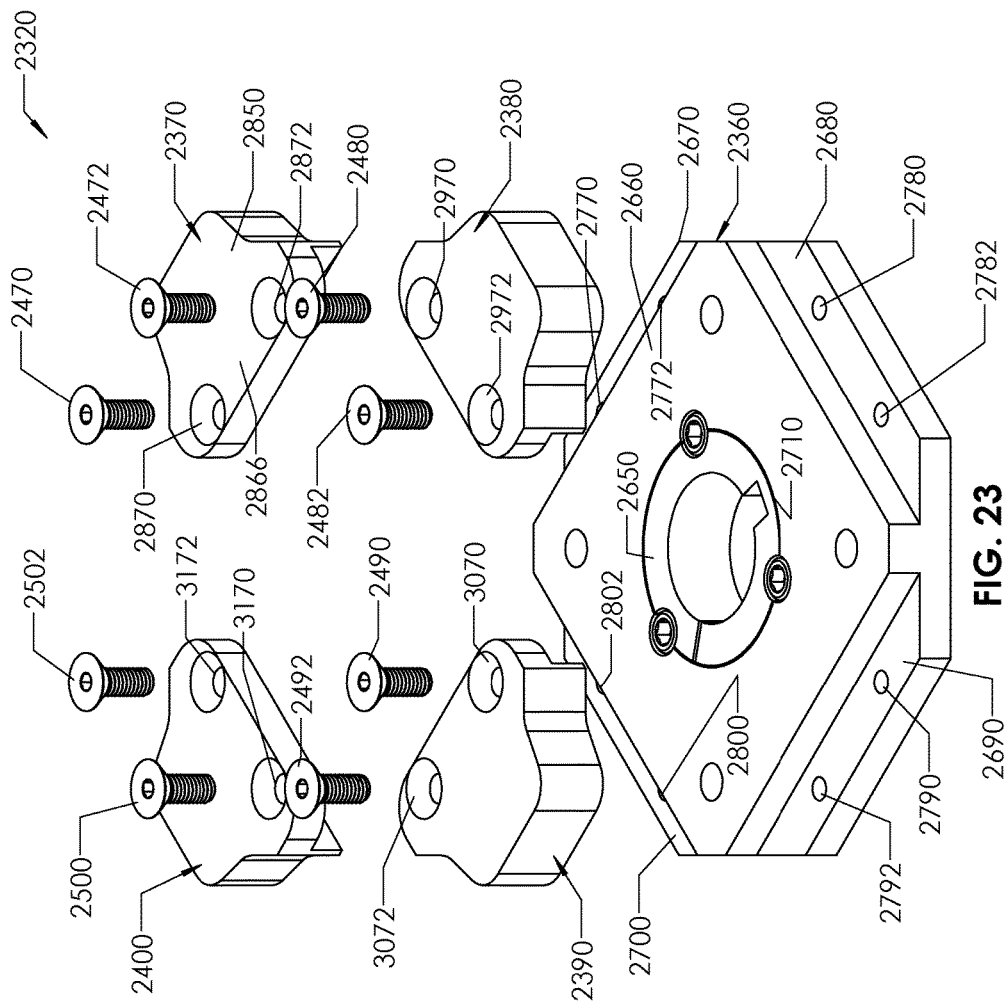
FIG. 23 is an exploded schematic of the sprocket assembly of FIG. 22.

Referring to FIGS. 21-23, a car wash conveyor system 2310 in accordance with another exemplary embodiment is provided. The car wash conveyor system 2310 includes a sprocket assembly 2320, a sprocket assembly 2330, a chain 2332, a car wash roller assembly 2334, a car wash roller assembly 2336, a motor 2338, and a motor controller 2340. An advantage of the sprocket assembly 2320 is that the sprocket assembly 2320 utilizes removable teeth having recessed screws for coupling the removable teeth to an octagonal-shaped sprocket frame 2360. Each of the recessed screws have a top surface that is substantially co-planar with a top surface of a respective tooth. As a result, the screws are less likely to contact other components of a car wash conveyor system.

The motor 2338 has a shaft (not shown) that rotates the sprocket assembly 2320 in response to receiving control signals from the motor controller 2340. When the sprocket assembly 2320 rotates in a first rotational direction, removable teeth in the sprocket assembly 2320 operably engage chain links in the chain 2332 to move the chain 2332 in a predetermined direction. In response to the movement of the chain 2332 in the predetermined direction, car wash roller assemblies 2334, 2336 that are coupled to the chain 2332 move along with the chain 2332. Further, the sprocket assembly 2330 operably engages chain links in the chain 2332 and rotates in the first rotational direction response to the movement of the chain 2332.

The sprocket assemblies 2320, 2330 have an identical structure to one another. Accordingly, only the structure of the sprocket assembly 2320 will be described in greater detail below. The sprocket assembly 2320 includes an octagonal-shaped sprocket frame 2360, a removable tooth 2370, a removable tooth 2380, a removable tooth 2390, a removable tooth 2400, screws 2470, 2472, 2480, 2482, 2490, 2492, 2500, 2502, an insert bushing 2650, and screws 2652, 2654, 2656.

Figure 24:
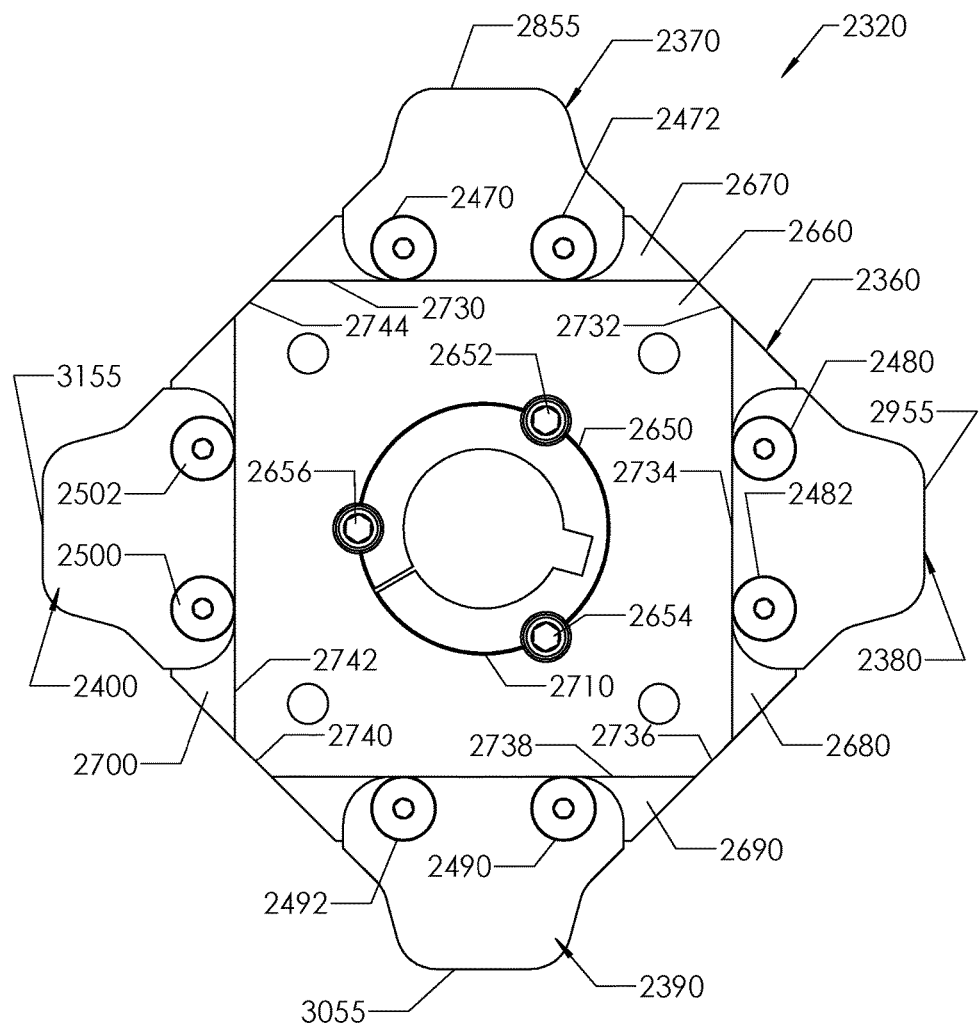
FIG. 24 is a schematic having a top view of the sprocket assembly of FIG. 22.
Figure 25:
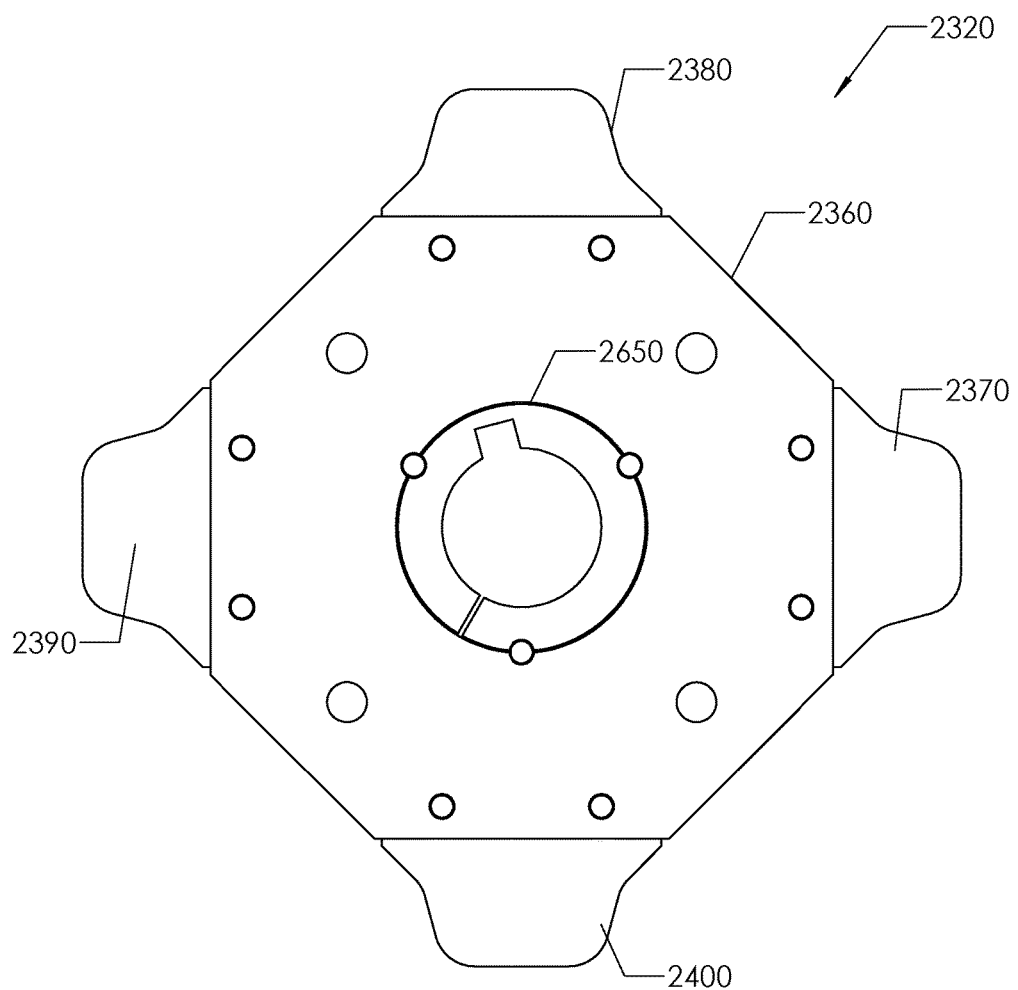
FIG. 25 is a schematic having a bottom view of the sprocket assembly of FIG. 22.

Referring to FIGS. 23-25, the octagonal-shaped sprocket frame 2360 is configured to be coupled to a rotatable shaft of the motor 2338 and is further configured to hold the removable teeth 2370, 2380, 2390, 2400 thereon. The sprocket frame 2360 includes the central body 2660, and trapezoidal-shaped ledge portions 2670, 2680, 2690, 2700 that extend outwardly from an outer periphery of the central body 2660. In an exemplary embodiment, the octagonal-shaped sprocket frame 2660 is constructed of steel. In an alternative embodiment, the octagonal-shaped sprocket frame 2360 is constructed of plastic.

Referring to FIG. 24, the central body 2660 includes a central aperture 2710 extending therethrough that is configured to receive the insert bushing 2650 therein. The thickness of the central body 2660 is greater than a thickness of each of the trapezoidal-shaped ledge portions 2670-2700. In an exemplary embodiment, the central body 2660 has ends 2730, 2732, 2734, 2736, 2738, 2740, 2742, 2744. The ends 2730, 2738 extend substantially parallel to one another, the ends 2734, 2742 extending substantially parallel to one another and substantially perpendicular to the ends 2730, 2738. The end 2732 extends between the ends 2730, 2734 and is substantially parallel to the end 2740. The end 2736 extends between the ends 2734, 2738 and is substantially parallel to the end 2744. The end 2740 extends between the ends 2738, 2742 and is substantially parallel to the end 2732. The end 2744 extends between the ends 2742, 2730 and is substantially parallel to the end 2736. Also, the trapezoidal-shaped ledge portions 2670, 2690 extend generally parallel to one another. The trapezoidal-shaped ledge portions 2680, 2700 extend generally parallel to one another and perpendicular to the ledge portions 2670, 2690.

Figure 32:
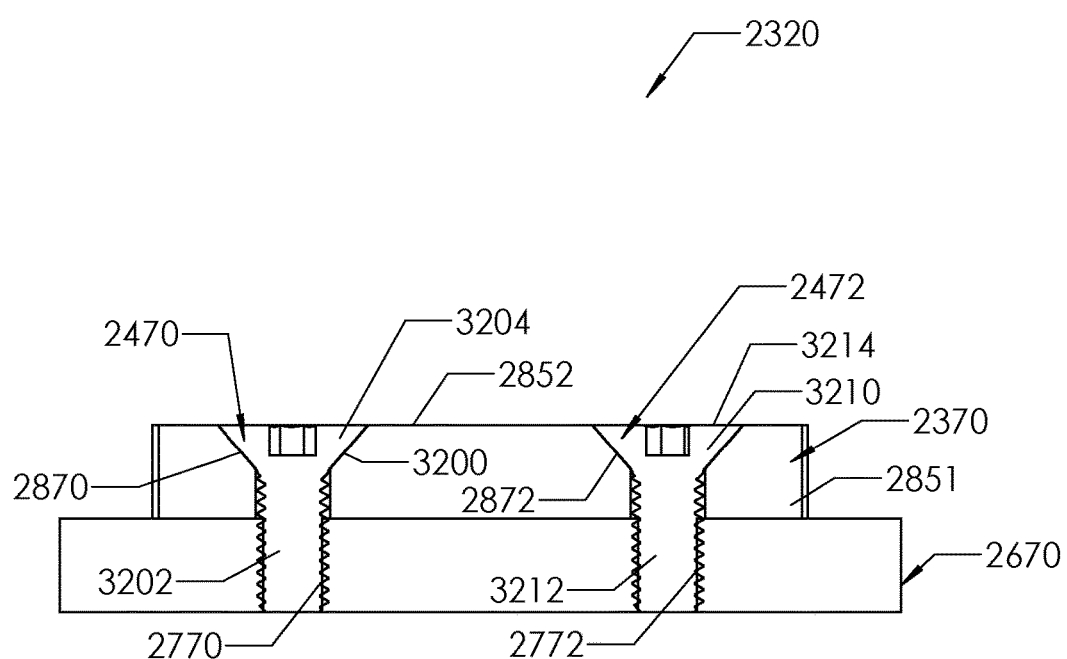
FIG. 32 is a cross-sectional view of the sprocket assembly of FIG. 22 taken along lines 32-32.

Referring to FIGS. 22, 23, and 32, the trapezoidal-shaped ledge portion 2670 is configured to hold an extension portion 2851 of the removable tooth 2370 thereon and includes apertures 2770, 2772 extending therethrough that define internal threads.

Figure 33:
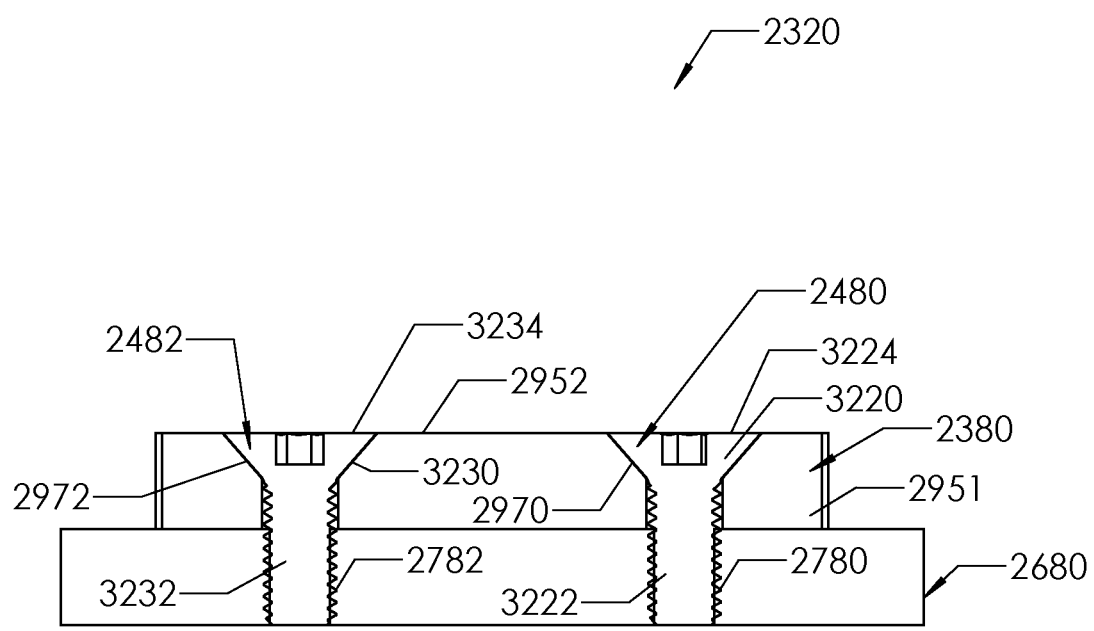
FIG. 33 is a cross-sectional view of the sprocket assembly of FIG. 22 taken along lines 33-33.

Referring to FIGS. 22, 23, and 33, the trapezoidal-shaped ledge portion 2680 is configured to hold an extension portion 2951 of the removable tooth 2380 thereon and includes apertures 2780, 2782 extending therethrough.

Figure 34:
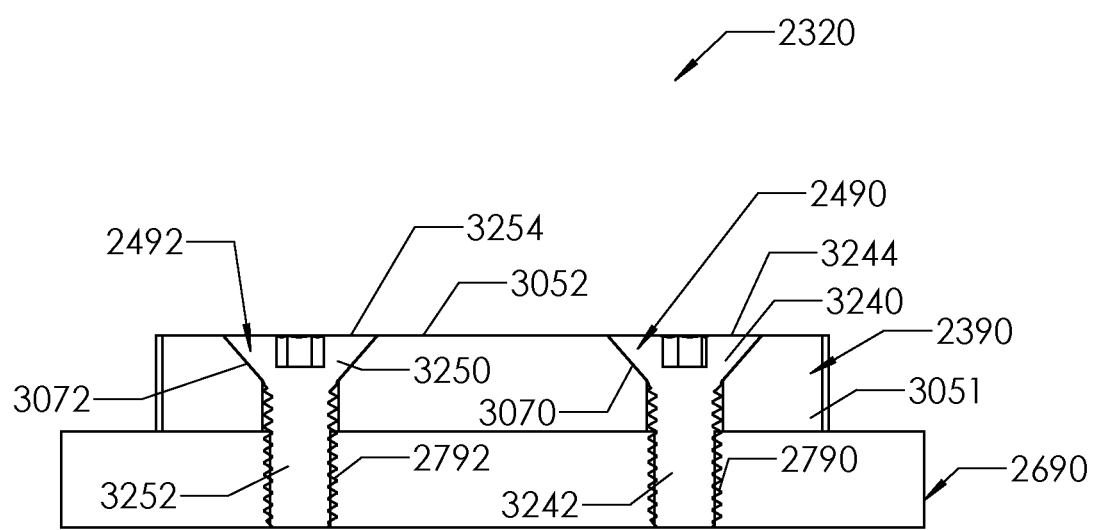
FIG. 34 is a cross-sectional view of the sprocket assembly of FIG. 22 taken along lines 34-34.

Referring to FIGS. 22, 23, and 34, the trapezoidal-shaped ledge portion 2690 is configured to hold an extension portion 3051 of the removable tooth 2390 thereon and includes apertures 2790, 2792 extending therethrough that define internal threads.

Figure 35:
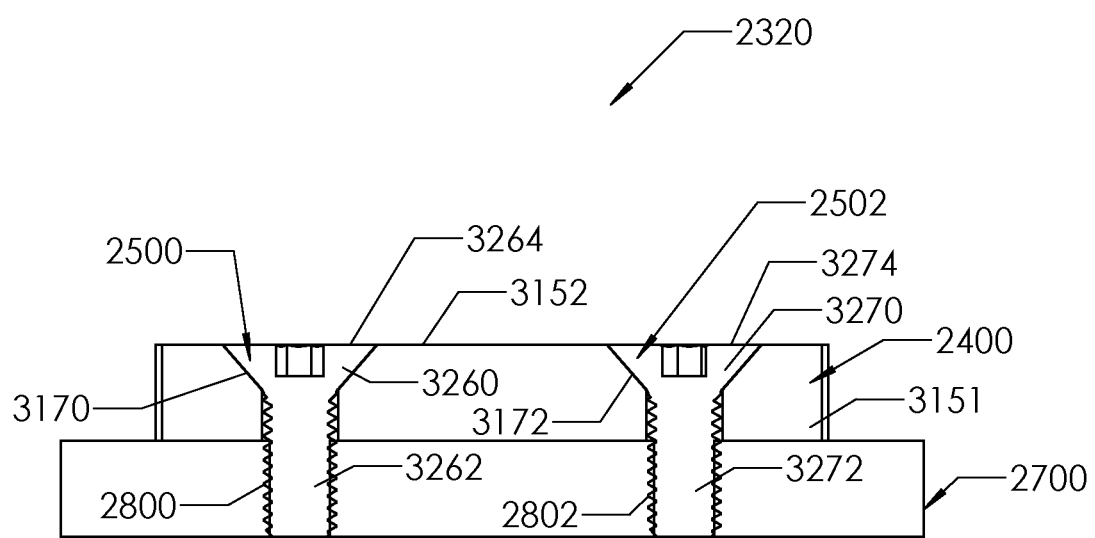
FIG. 35 is a cross-sectional view of the sprocket assembly of FIG. 22 taken along lines 35-35.

Referring to FIGS. 22, 23, and 35, the trapezoidal-shaped ledge portion 2700 is configured to hold an extension portion 3151 of the removable tooth 2400 thereon and includes apertures 2800, 2802 extending therethrough that define internal threads.

Referring to FIGS. 23-25, the removable teeth 2370, 2380, 2390, 2400 are configured to be removably coupled to the trapezoidal-shaped ledge portions 2670, 2680, 2690, 2700, respectively. The structure of the removable teeth 2370, 2380, 2390, 2400 are identical to one another. In an exemplary embodiment, the removable teeth 2370, 2380, 2390, 2400 are constructed of steel. In an alternative embodiment, the removable teeth 2370, 2380, 2390, 2400 are constructed of plastic.

Referring to FIGS. 23, 24 and 26-28, the removable tooth 2370 includes a tip portion 2850 and an extension portion 2851. The tip portion 2850 and the extension portion 2851 define a top surface 2852 of the removable tooth 2370. The tip portion 2850 has a bottom surface 2854, an end surface 2855, and first and second ends 2856, 2858. The extension portion 2851 extends from the second end 2858 and has the apertures 2870, 2872 extending therethrough. The end surface 2855 of the removable tooth 2370 extends substantially parallel to the end surface 3055 of the removable tooth 2390 (shown in FIGS. 24 and 30).

Figure 36:
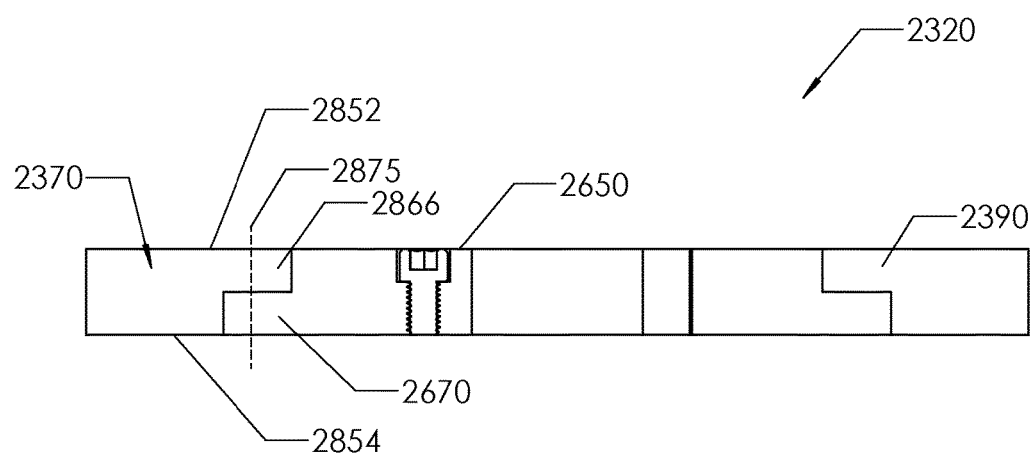
FIG. 36 is a cross-sectional view of the sprocket assembly of FIG. 22 taken along lines 36-36.

Referring to FIG. 36, a thickness of the tip portion 2850, between the top surface 2852 and the bottom surface 2854, is substantially equal to a combined thickness of both the extension portion 2866 and the ledge portion 2670 in a direction parallel to an axis 2875. The axis 2875 extends substantially perpendicular to the top surface 2852 and the bottom surface 2854.

Figure 29:
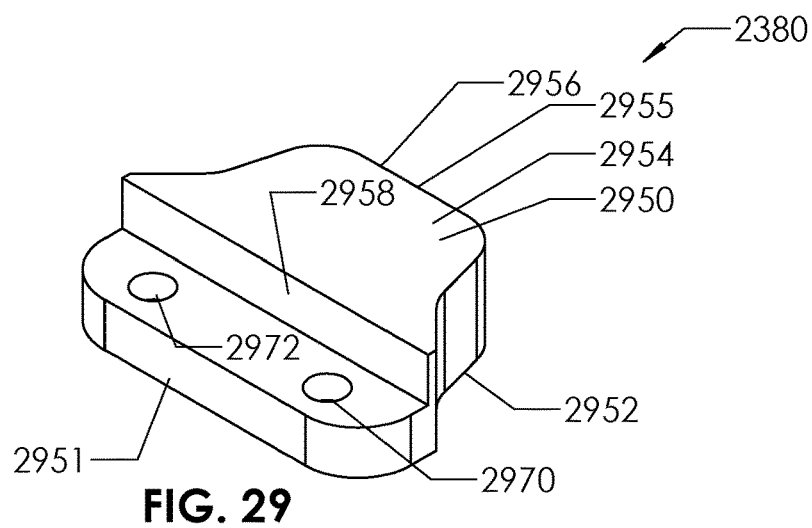
FIG. 29 is a schematic having an isometric view of a second removable tooth utilized in the sprocket assembly of FIG. 22.

Referring to FIGS. 23, 24 and 29, the removable tooth 2380 includes a tip portion 2950 and an extension portion 2951. The tip portion 2950 and the extension portion 2951 define a top surface 2952 of the removable tooth 2380. The tip portion 2950 has a bottom surface 2954, an end surface 2955, and first and second ends 2956, 2958. The extension portion 2951 extends from the second end 2958 and has the apertures 2970, 2972 extending therethrough. The end surface 2955 of the removable tooth 2380 extends substantially parallel to the end surface 3155 of the removable tooth 2400 (shown in FIGS. 24 and 31).

Figure 30:
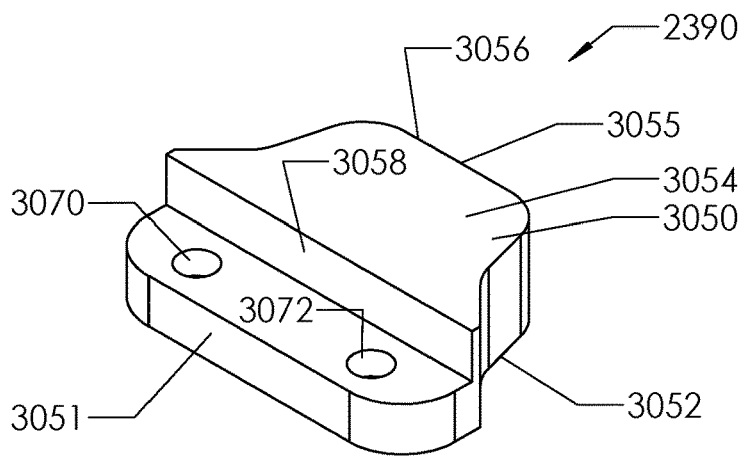
FIG. 30 is a schematic having an isometric view of a third removable tooth utilized in the sprocket assembly of FIG. 22.

Referring to FIGS. 23 and 30, the removable tooth 2390 includes a tip portion 3050 and an extension portion 3051. The tip portion 3050 and the extension portion 3051 define a top surface 3052 of the removable tooth 2390. The tip portion 3050 has a bottom surface 3054, an end surface 3055, and first and second ends 3056, 3058. The extension portion 3051 extends from the second end 3058 and has the apertures 3070, 3072 extending therethrough. The end surface 3055 of the removable tooth 2390 extends substantially parallel to the end surface 2855 of the removable tooth 2370 (shown in FIGS. 24 and 26).

Figure 31:
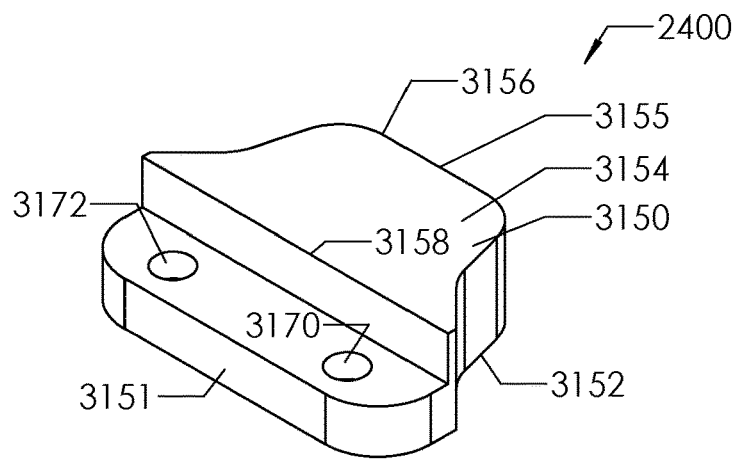
FIG. 31 is a schematic having an isometric view of a fourth removable tooth utilized in the sprocket assembly of FIG. 22.

Referring to FIGS. 23 and 31, the removable tooth 2400 includes a tip portion 3150 and an extension portion 3151. The tip portion 3150 and the extension portion 3151 define a top surface 3152 of the removable tooth 2400. The tip portion 3150 has a bottom surface 3154, an end surface 3155, and first and second ends 3156, 3158. The extension portion 3151 extends from the second end 3158 and has the apertures 3170, 3172 extending therethrough. The end surface 3155 of the removable tooth 2400 extends substantially parallel to the end surface 2955 of the removable tooth 2380 (shown in FIGS. 24 and 29).

Referring to FIGS. 23, 24 and 32, the screws 2470, 2472 are configured to extend through the apertures 2870, 2872, respectively, in the extension portion 2851 of the removable tooth 2370, and through the threaded apertures 2770, 2772, respectively, in the trapezoidal-shaped ledge portion 2670.

The screw 2470 includes a head portion 3200 and a threaded shaft portion 3202. The threaded shaft portion 3202 is coupled to and extends from the head portion 3200. The head portion 3200 is a tapered head portion and has a top surface 3204 that is substantially co-planar with the top surface 2852 of the removable tooth 2370.

The screw 2472 includes a head portion 3210 and a threaded shaft portion 3212. The threaded shaft portion 3212 is coupled to and extends from the head portion 3210. The head portion 3210 is a tapered head portion and has a top surface 3214 that is substantially co-planar with the top surface 2852 of the removable tooth 2370.

Referring to FIGS. 23, 29, and 33, the screws 2480, 2482 are configured to extend through the apertures 2970, 2972, respectively, in the extension portion 2951 of the removable tooth 2380, and through the threaded apertures 2780, 2782, respectively, in the trapezoidal-shaped ledge portion 2680.

The screw 2480 includes a head portion 3220 and a threaded shaft portion 3222. The threaded shaft portion 3222 is coupled to and extends from the head portion 3220. The head portion 3220 is a tapered head portion and has a top surface 3224 that is substantially co-planar with the top surface 2952 of the removable tooth 2380.

The screw 2482 includes a head portion 3230 and a threaded shaft portion 3232. The threaded shaft portion 3232 is coupled to and extends from the head portion 3230. The head portion 3230 is a tapered head portion and has a top surface 3234 that is substantially co-planar with the top surface 2952 of the removable tooth 2380.

Referring to FIGS. 23, 30, and 34, the screws 2490, 2492 are configured to extend through the apertures 3070, 3072, respectively, in the extension portion 3051 of the removable tooth 2390, and through the threaded apertures 2790, 2792, respectively, in the trapezoidal-shaped ledge portion 2690.

The screw 2490 includes a head portion 3240 and a threaded shaft portion 3242. The threaded shaft portion 3242 is coupled to and extends from the head portion 3240. The head portion 3240 is a tapered head portion and has a top surface 3244 that is substantially co-planar with the top surface 3052 of the removable tooth 2390.

The screw 2492 includes a head portion 3250 and a threaded shaft portion 3252. The threaded shaft portion 3252 is coupled to and extends from the head portion 3250. The head portion 3250 is a tapered head portion and has a top surface 3254 that is substantially co-planar with the top surface 3052 of the removable tooth 2390.

Referring to FIGS. 23, 31, and 35, the screws 2500, 2502 are configured to extend through the apertures 3170, 3172, respectively, in the extension portion 3151 of the removable tooth 2400, and through the apertures 2800, 2802, respectively, in the trapezoidal-shaped ledge portion 2700.

The screw 2500 includes a head portion 3260 and a threaded shaft portion 3262. The threaded shaft portion 3262 is coupled to and extends from the head portion 3260. The head portion 3260 is a tapered head portion and has a top surface 3264 that is substantially co-planar with the top surface 3152 of the removable tooth 2400.

The screw 2502 includes a head portion 3270 and a threaded shaft portion 3272. The threaded shaft portion 3272 is coupled to and extends from the head portion 3270. The head portion 3270 is a tapered head portion and has a top surface 3274 that is substantially co-planar with the top surface 3152 of the removable tooth 2400.

Referring to FIGS. 22 and 23, the insert bushing 2650 is configured to be received within the central aperture 2710 of the octagonal-shaped sprocket frame 2360. In an exemplary embodiment, the insert bushing 2650 is substantially split-ring-shaped and has an internal aperture extending therethrough. In an exemplary embodiment, the insert bushing 2650 is constructed of steel. In an alternative embodiment, the insert bushing 2650 is constructed of plastic. The insert bushing 2650 is fixedly coupled to the central body 2660 of the octagonal-shaped sprocket frame 2360 utilizing the screws 2652, 2654, 2656 which are recessed into the insert bushing 2650. The screws 2652, 2654, 2656 have an identical structure as the screws 2470-2502 discussed above. A shaft of the motor 2338 (shown in FIG. 21) is received in the internal aperture of the insert bushing 2650 and is coupled to the insert bushing 2650 such that rotation of the motor shaft causes rotation of the octagonal-shaped sprocket frame 2360.

Referring to FIG. 21, the chain 2332 includes a plurality of chain links 2332 that are coupled together. At least one of the chain links 2332 is operably coupled to the car wash roller assembly 2334, and at least one of the chain links 2332 is operably coupled to the car wash roller assembly 2336. In an exemplary embodiment, the plurality of chain links 2232 are constructed of steel. In an alternative embodiment, the plurality of chain links 2232 are constructed of plastic.

The sprocket assemblies and the method described herein provide a substantial advantage over sprocket assemblies and methods. In particular, the sprocket assemblies and method utilize removable teeth with extension portions coupled to ledge portions of the sprocket assemblies to allow a user to readily replace the removable teeth when the removable teeth become degraded.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A sprocket assembly, comprising:
an octagonal-shaped sprocket frame having a central body and first, second, third, and fourth trapezoidal-shaped ledge portions extending from the central body;
the central body having first, second, third, and fourth ends; the first and second ends of the central body extending substantially parallel to one another, the third and fourth ends of the central body extending substantially parallel to one another and substantially perpendicular to the first and second ends of the central body;
the first and second trapezoidal-shaped ledge portions being coupled to and extending from the first and second ends, respectively, of the central body and being spaced apart from one another and extending substantially parallel to one another;
the third and fourth trapezoidal-shaped ledge portions being coupled to and extending from the third and fourth ends, respectively, of the central body and being spaced apart from one another and extending substantially parallel to one another and substantially perpendicular to the first and second trapezoidal-shaped ledge portions;
a first removable tooth having a first tip portion and a first extension portion, the first tip portion and the first extension portion defining a top surface of the first removable tooth, the first tip portion having first and second ends, the first extension portion extending from the second end of the first tip portion, the first extension portion being removably coupled to a first surface of the first trapezoidal-shaped ledge portion utilizing a first screw extending through first and second apertures in the first extension portion and the first trapezoidal-shaped ledge portion, respectively; the first aperture having a tapered aperture portion extending from the top surface of the first removable tooth into the first extension portion;
the first screw having a first tapered head portion and a first shaft portion coupled to the first tapered head portion, the first tapered head portion being disposed in the tapered aperture portion of the first aperture in the first extension portion of the first removable tooth such that a flat top surface of the first tapered head portion is disposed substantially co-planar with the top surface of the first removable tooth, the first shaft portion of the first screw extending through a portion of the first aperture in the first extension portion of the first removable tooth and through the second aperture in the first trapezoidal-shaped ledge portion such that an end surface of the first shaft portion of the first screw is substantially co-planar with a second surface of the first trapezoidal shaped ledge portion;
a second removable tooth having a second tip portion and a second extension portion, the second tip portion and the second extension portion defining a top surface of the second removable tooth, the second tip portion having first and second ends, the second extension portion extending from the second end of the second tip portion, the second extension portion being removably coupled to a first surface of the second trapezoidal-shaped ledge portion utilizing a second screw extending through third and fourth apertures in the second extension portion and the second trapezoidal-shaped ledge portion, respectively, the third aperture having a tapered aperture portion extending from the top surface of the second removable tooth into the second extension portion; and the second screw having a second tapered head portion and a second shaft portion coupled to the second tapered head portion, the second tapered head portion being disposed in the tapered aperture portion of the third aperture in the second extension portion of the second removable tooth such that a flat top surface of the second tapered head portion is disposed substantially co-planar with the top surface of the second removable tooth, the second shaft portion of the second screw extending through a portion of the third aperture in the second extension portion of the second removable tooth and through the fourth aperture in the second trapezoidal-shaped ledge portion such that an end surface of the second shaft portion of the second screw is substantially co-planar with a second surface of the second trapezoidal shaped ledge portion.

2. The sprocket assembly of claim 1, further comprising: a third removable tooth having a third tip portion and a third extension portion, the third tip portion and the third extension portion defining a top surface of the third removable tooth, the third tip portion having first and second ends, the third extension portion extending from the second end of the third tip portion, the third extension portion being removably coupled to a first surface of the third trapezoidal-shaped ledge portion utilizing a third screw extending through fifth and sixth apertures in the third extension portion and the third trapezoidal-shaped ledge portion, respectively, the fifth aperture having a tapered aperture portion extending from the top surface of third removable tooth into the third extension portion; and the third screw having a third tapered head portion and a third shaft portion coupled to the third tapered head portion, the third tapered head portion being disposed in the tapered aperture portion of the fifth aperture in the third extension portion of the third removable tooth such that a flat top surface of the third tapered head portion is disposed substantially co-planar with the top surface of the third removable tooth, the third shaft portion of the third screw extending through a portion of the fifth aperture in the third extension portion of the third removable tooth and through the sixth aperture in the third trapezoidal-shaped ledge portion such that an end surface of the third shaft portion of the third screw is substantially co-planar with a second surface of the third trapezoidal shaped ledge portion.

3. The sprocket assembly of claim 2, further comprising a fourth removable tooth having a fourth tip portion and a fourth extension portion, the fourth tip portion and the fourth extension portion defining a top surface of the fourth removable tooth, the fourth tip portion having first and second ends, the fourth extension portion extending from the second end of the fourth tip portion, the fourth extension portion being removably coupled to a first surface of the fourth trapezoidal-shaped ledge portion utilizing a fourth screw extending through seventh and eighth apertures in the fourth extension portion and the fourth trapezoidal-shaped ledge portion, respectively, the seventh aperture having a tapered aperture portion extending from the top surface of fourth removable tooth into the fourth extension portion; and the fourth screw having a fourth tapered head portion and a fourth shaft portion coupled to the fourth tapered head portion, the fourth tapered head portion being disposed in the tapered aperture portion of the seventh aperture in the fourth extension portion of the fourth removable tooth such that a flat top surface of the fourth tapered head portion is disposed substantially co-planar with the top surface of the fourth removable tooth, the fourth shaft portion of the fourth screw extending through a portion of the seventh aperture in the fourth extension portion of the fourth removable tooth and through the eighth aperture in the fourth trapezoidal-shaped ledge portion such that an end surface of the fourth shaft portion of the fourth screw is substantially co-planar with a second surface of the fourth trapezoidal shaped ledge portion.

4. The sprocket assembly of claim 3, wherein an end surface of the first tip portion of the first removable tooth extending substantially parallel to an end surface of the second tip portion of the second removable tooth; and an end surface of the third tip portion of the third removable tooth extending substantially parallel to an end surface of the fourth tip portion of the fourth removable tooth and substantially perpendicular to the end surface of the first tip portion of the first removable tooth.

5. The sprocket assembly of claim 1, wherein the first tip portion of the first removable tooth is configured to operably engage a chain link.

6. The sprocket assembly of claim 1, wherein a first axis extends between a top surface and a bottom surface of the first tip portion of the first removable tooth generally perpendicular to the top surface and the bottom surface of the first tip portion, a thickness of the first tip portion is substantially equal to a combined thickness of both the first extension portion and the first trapezoidal-shaped ledge portion in a direction parallel to the first axis.

7. The sprocket assembly of claim 1, wherein the central body of the octagonal-shaped sprocket frame has a central aperture extending therethrough that is configured to receive an insert bushing therein, the insert bushing being removably coupled to the central body.

\* \* \* \* \*